(12) United States Patent
Leacock et al.

(10) Patent No.: US 8,775,595 B2
(45) Date of Patent: Jul. 8, 2014

(54) RELATIONSHIP BASED PRESENCE INDICATING IN VIRTUAL AREA CONTEXTS

(75) Inventors: Matthew Leacock, Sunnyvale, CA (US); David Van Wie, Eugene, OR (US); Paul J. Brody, Palo Alto, CA (US)

(73) Assignee: Social Communications Company, Santa Clara, CA (US)

( * ) Notice: Subject to any disclaimer, the term of this patent is extended or adjusted under 35 U.S.C. 154(b) by 112 days.

(21) Appl. No.: 13/229,395

(22) Filed: Sep. 9, 2011

(65) Prior Publication Data

US 2012/0324001 A1 Dec. 20, 2012

Related U.S. Application Data

(60) Provisional application No. 61/381,956, filed on Sep. 11, 2010.

(51) Int. Cl.
*G06F 15/173* (2006.01)

(52) U.S. Cl.
USPC ............................ 709/223; 709/203; 709/217

(58) Field of Classification Search
USPC .................. 709/223, 224, 203, 206, 217, 219
See application file for complete search history.

(56) References Cited

U.S. PATENT DOCUMENTS

| | | | |
|---|---|---|---|
| 5,471,318 A | 11/1995 | Ahuja | |
| 5,491,743 A * | 2/1996 | Shiio et al. | 709/204 |
| 5,627,978 A | 5/1997 | Altom | |
| 5,764,916 A | 6/1998 | Busey | |
| 5,793,365 A | 8/1998 | Tang | |
| 5,982,372 A | 11/1999 | Brush, II | |
| 5,999,208 A | 12/1999 | McNerney | |
| 6,057,856 A | 5/2000 | Miyashita | |
| 6,119,166 A | 9/2000 | Bergman | |
| 6,175,831 B1 | 1/2001 | Weinreich et al. | |

(Continued)

FOREIGN PATENT DOCUMENTS

| | | |
|---|---|---|
| EP | 1844827 | 10/2007 |
| EP | 2237537 | 10/2010 |

(Continued)

OTHER PUBLICATIONS

International Search Report and Written Opinion for counterpart International Application No. PCT/US2011/051045 (mailed Sep. 9, 2011).

(Continued)

*Primary Examiner* — LaShonda Jacobs
(74) *Attorney, Agent, or Firm* — Edouard Garcia

(57) ABSTRACT

Other communicants in a network communications environment who have relationship ties with a user that satisfy a particular relationship predicate and who are present in a zone of a respective other virtual area that is assigned to the other communicant are determined. Indications of presence of the determined other communicants in the zones of the other virtual areas is transmitted to the user. Each virtual area is associated with a respective communicant who is present in the virtual area and has a relationship tie with the user that satisfies a relationship predicate. Responsive to user input referencing a selected virtual area, a request to establish a presence for the user in the selected virtual area is transmitted. Responsive to user input referencing a particular communicant, a request to establish a network communications link between the respective network nodes operated by the user and the particular communicant is transmitted.

23 Claims, 12 Drawing Sheets

(56) References Cited

U.S. PATENT DOCUMENTS

| | | |
|---|---|---|
| 6,219,045 B1 | 4/2001 | Leahy |
| 6,237,025 B1 | 5/2001 | Ludwig |
| 6,275,490 B1 | 8/2001 | Mattaway |
| 6,380,952 B1 | 4/2002 | Mass |
| 6,392,760 B1 | 5/2002 | Ahuja |
| 6,572,476 B2 | 6/2003 | Shoji |
| 6,580,441 B2 | 6/2003 | Schileru-Key |
| 6,708,172 B1 | 3/2004 | Wong |
| 6,714,222 B1 | 3/2004 | Bjorn |
| 6,731,314 B1 | 5/2004 | Cheng |
| 6,732,170 B2 * | 5/2004 | Miyake et al. ............... 709/223 |
| 6,738,807 B1 * | 5/2004 | Matsui et al. ............... 709/223 |
| 6,785,708 B1 | 8/2004 | Busey |
| 6,832,245 B1 | 12/2004 | Isaacs et al. |
| 6,862,625 B1 | 3/2005 | Busey |
| 7,016,978 B2 | 3/2006 | Malik |
| 7,036,082 B1 * | 4/2006 | Dalrymple et al. ........... 715/757 |
| 7,047,202 B2 | 5/2006 | Jaipuria et al. |
| 7,058,896 B2 | 6/2006 | Hughes |
| 7,069,308 B2 | 6/2006 | Abrams |
| 7,165,213 B1 | 1/2007 | Busey |
| 7,168,051 B2 | 1/2007 | Robinson et al. |
| 7,181,690 B1 | 2/2007 | Leahy |
| 7,184,037 B2 | 2/2007 | Gallery |
| 7,246,145 B1 * | 7/2007 | Gits et al. ............... 709/202 |
| 7,263,076 B1 * | 8/2007 | Leibovitz et al. ............ 370/310 |
| 7,263,526 B1 | 8/2007 | Busey |
| 7,336,779 B2 | 2/2008 | Boyer |
| 7,392,306 B1 | 6/2008 | Donner |
| 7,426,540 B1 * | 9/2008 | Matsumoto et al. .......... 709/206 |
| 7,474,741 B2 | 1/2009 | Brunson |
| 7,478,086 B2 | 1/2009 | Samn |
| 7,493,558 B2 * | 2/2009 | Leahy et al. ............... 715/704 |
| 7,516,411 B2 | 4/2009 | Grossner |
| 7,616,624 B2 | 11/2009 | John |
| 7,676,542 B2 | 3/2010 | Moser |
| 7,680,098 B2 | 3/2010 | John |
| 7,680,480 B2 * | 3/2010 | John et al. ............... 455/405 |
| 7,707,249 B2 | 4/2010 | Spataro |
| 7,734,691 B2 | 6/2010 | Creamer |
| 7,747,719 B1 | 6/2010 | Horovitz |
| 7,765,259 B2 | 7/2010 | MacVarish |
| 7,769,606 B2 * | 8/2010 | Boone et al. ............... 705/4 |
| 7,769,806 B2 * | 8/2010 | Van Wie et al. ............. 709/203 |
| 7,805,406 B2 * | 9/2010 | Craig ............... 707/622 |
| 7,827,288 B2 | 11/2010 | Da Palma |
| 7,840,668 B1 * | 11/2010 | Sylvain et al. ............. 709/224 |
| 7,882,222 B2 * | 2/2011 | Dolbier et al. ............. 709/224 |
| 7,895,208 B2 * | 2/2011 | Konopnicki ............... 707/738 |
| 7,958,453 B1 * | 6/2011 | Taing ............... 715/744 |
| 8,136,056 B2 * | 3/2012 | Scheffer et al. ............. 716/52 |
| 8,145,998 B2 * | 3/2012 | Leahy et al. ............... 715/706 |
| 8,219,616 B2 * | 7/2012 | Dawson et al. ............. 709/205 |
| 8,321,525 B2 * | 11/2012 | Gaver et al. ............... 709/217 |
| 8,358,302 B2 * | 1/2013 | Castelli et al. ............. 345/419 |
| 8,375,397 B1 * | 2/2013 | Mendes da Costa et al. . 719/310 |
| 8,407,607 B2 * | 3/2013 | Cragun et al. ............. 715/757 |
| 2002/0080195 A1 | 6/2002 | Carlson |
| 2002/0085035 A1 * | 7/2002 | Orbanes et al. ............. 345/764 |
| 2002/0089550 A1 * | 7/2002 | Orbanes et al. ............. 345/853 |
| 2002/0097267 A1 | 7/2002 | Dinan |
| 2002/0109680 A1 * | 8/2002 | Orbanes et al. ............. 345/418 |
| 2003/0043200 A1 | 3/2003 | Faieta |
| 2003/0046374 A1 | 3/2003 | Hilt |
| 2003/0050977 A1 * | 3/2003 | Puthenkulam et al. ....... 709/204 |
| 2003/0191799 A1 | 10/2003 | Araujo |
| 2003/0222902 A1 | 12/2003 | Chupin |
| 2004/0030783 A1 | 2/2004 | Hwang |
| 2004/0158610 A1 | 8/2004 | Davis |
| 2004/0162830 A1 * | 8/2004 | Shirwadkar et al. .......... 707/10 |
| 2005/0108033 A1 | 5/2005 | Everett-Church |
| 2005/0138570 A1 | 6/2005 | Good |
| 2005/0160094 A1 | 7/2005 | Morgenstern et al. |
| 2005/0163311 A1 | 7/2005 | Fowler |
| 2005/0171955 A1 | 8/2005 | Hull |
| 2006/0010240 A1 | 1/2006 | Chuah |
| 2006/0042483 A1 | 3/2006 | Work |
| 2006/0075055 A1 * | 4/2006 | Littlefield ............... 709/206 |
| 2006/0117264 A1 | 6/2006 | Beaton |
| 2006/0121987 A1 | 6/2006 | Bartnik et al. |
| 2006/0121990 A1 | 6/2006 | O'Kelley |
| 2006/0167972 A1 | 7/2006 | Zombek |
| 2006/0184886 A1 | 8/2006 | Chung |
| 2006/0248159 A1 | 11/2006 | Polan |
| 2006/0248573 A1 | 11/2006 | Tejinder |
| 2006/0253584 A1 | 11/2006 | Dixon |
| 2006/0271460 A1 | 11/2006 | Hanif |
| 2006/0282493 A1 | 12/2006 | Ivvamura et al. |
| 2007/0047700 A1 | 3/2007 | Mohler |
| 2007/0150498 A1 | 6/2007 | Li et al. |
| 2007/0162570 A1 * | 7/2007 | Mathur et al. ............... 709/219 |
| 2007/0192299 A1 | 8/2007 | Zuckerberg et al. |
| 2007/0220111 A1 | 9/2007 | Lin |
| 2007/0233785 A1 | 10/2007 | Abraham |
| 2007/0240119 A1 | 10/2007 | Ducheneaut et al. |
| 2007/0255831 A1 | 11/2007 | Hayashi et al. |
| 2007/0274291 A1 | 11/2007 | Diomelli |
| 2007/0279484 A1 | 12/2007 | Derocher |
| 2007/0291034 A1 | 12/2007 | Dones |
| 2007/0299778 A1 * | 12/2007 | Haveson et al. ............... 705/51 |
| 2008/0005282 A1 | 1/2008 | Gaedcke |
| 2008/0019285 A1 | 1/2008 | John |
| 2008/0021870 A1 | 1/2008 | Birnbaum et al. |
| 2008/0021949 A1 | 1/2008 | John |
| 2008/0052373 A1 | 2/2008 | Pousti |
| 2008/0059570 A1 | 3/2008 | Bill |
| 2008/0104079 A1 * | 5/2008 | Craig ............... 707/9 |
| 2008/0104495 A1 * | 5/2008 | Craig ............... 715/205 |
| 2008/0139318 A1 * | 6/2008 | Van Luchene et al. ......... 463/42 |
| 2008/0162262 A1 | 7/2008 | Perkins |
| 2008/0163090 A1 | 7/2008 | Cortright |
| 2008/0163379 A1 | 7/2008 | Robinson et al. |
| 2008/1168154 | 7/2008 | Skyrm |
| 2009/0089157 A1 * | 4/2009 | Narayanan ............... 705/14 |
| 2009/0106376 A1 | 4/2009 | Tom |
| 2009/0125481 A1 * | 5/2009 | Mendes da Costa et al. ..... 707/3 |
| 2009/0132931 A1 | 5/2009 | Tatsubori |
| 2009/0199275 A1 * | 8/2009 | Brock et al. ............... 726/4 |
| 2009/0241037 A1 | 9/2009 | Hyndman |
| 2009/0254842 A1 | 10/2009 | Leacock |
| 2009/0300521 A1 * | 12/2009 | Jerrard-Dunne et al. ..... 715/757 |
| 2009/0307189 A1 | 12/2009 | Bobbitt |
| 2010/0088130 A1 * | 4/2010 | Bonchi et al. ............... 705/7 |
| 2010/0138492 A1 | 6/2010 | Guzman |
| 2010/0162121 A1 | 6/2010 | Yoakum |
| 2010/0164956 A1 | 7/2010 | Hyndman |
| 2010/0169796 A1 | 7/2010 | Lynk |
| 2010/0169799 A1 * | 7/2010 | Hyndman et al. ............ 715/757 |
| 2010/0169837 A1 * | 7/2010 | Hyndman ............... 715/848 |
| 2010/0169888 A1 | 7/2010 | Hare |
| 2010/0180216 A1 * | 7/2010 | Bates et al. ............... 715/757 |
| 2010/0185733 A1 | 7/2010 | Hon |
| 2010/0198653 A1 * | 8/2010 | Bromenshenkel et al. ..... 705/10 |
| 2010/0216553 A1 * | 8/2010 | Chudley et al. ............. 463/42 |
| 2010/0228560 A1 | 9/2010 | Balasaygun |
| 2010/0235501 A1 | 9/2010 | Klemm |
| 2010/0241432 A1 | 9/2010 | Michaelis |
| 2010/0246570 A1 | 9/2010 | Chavez |
| 2010/0246571 A1 | 9/2010 | Geppert |
| 2010/0246800 A1 | 9/2010 | Geppert |
| 2010/0251119 A1 | 9/2010 | Geppert |
| 2010/0251124 A1 | 9/2010 | Geppert |
| 2010/0251127 A1 | 9/2010 | Geppert |
| 2010/0251142 A1 | 9/2010 | Geppert |
| 2010/0251158 A1 | 9/2010 | Geppert |
| 2010/0251177 A1 | 9/2010 | Geppert |
| 2010/0262550 A1 | 10/2010 | Burritt |
| 2010/0322395 A1 | 12/2010 | Michaelis |
| 2010/0332998 A1 * | 12/2010 | Sun et al. ............... 715/757 |
| 2011/0276883 A1 * | 11/2011 | Cabble et al. ............. 715/727 |
| 2011/0296319 A1 * | 12/2011 | Dinan et al. ............. 715/757 |

(56) References Cited

U.S. PATENT DOCUMENTS

2012/0050257 A1* 3/2012 Clarke .................... 345/419
2012/0150960 A1* 6/2012 Nalawade ................ 709/204
2012/0268468 A1* 10/2012 Elenzil .................... 345/441

FOREIGN PATENT DOCUMENTS

| EP | 2239930 | 10/2010 |
|----|---------|---------|
| WO | 0191868 | 12/2001 |
| WO | 0237471 | 5/2002 |
| WO | 2004004273 | 1/2004 |
| WO | 2007076150 | 7/2007 |
| WO | 2008112944 | 9/2008 |

OTHER PUBLICATIONS

Carman Neustaedter et al., The Social Network and Relationship Finder; Social Sorting for Email Triage, Proceedings of the 2005 Conference on Email and Anti-Spam, 2005, CEAS.

Vauhini Vara, Facebook Gets Personal With Ad Targeting Plan, The Wall Street Journal, Aug. 23. 2007, p. B1.

Micheal Gardner et al., Formation Process Tools for Creating Sustainable Virtual Research Communities, Proceedings of the 2004 ACM Conference on Computer Supported Cooperative Work, CSCW04 Workshop on Social Networks, Nov. 6-10, 2004, Chicago, Illinois.

"Peter Mika, Ontologies Are Us: A Unified Model of Social Networks and Semantics, Proceedings of 4th International Semantic Conference (ISWC2005), 2005, p. 522-536."

"Larry Page et al., The PageRank Citation Ranking: Bringing Order to the Web. Technical report, Stanford University Database Group, 1998. http://citeseer.nj.nec.com/368196.html."

"Jiaxing Song, Relation Grid: A Social Relationship Network Model, Proceedings of the International Conference on Sematics, Knowledge and Grid (SKG 2005), Nov. 27-29, 2005, Beijing, China"

Jennifer Golbeck et al., Inferring Trust Relationships in Web-based Social Networks, ACM Transactions on InternetTechnology (TOIT), Nov. 2006, p. 497-529, vol. 6, No. 4.

Stephan P. Marsh, Formalizing Trust as a Computational Concept, PhD thesis, 1994, University of Stirling, Department of Computer Science and Mathematics, Stirling, Scotland.

Hee-Chui Choi et al., Trust Models for Community-Aware Identity Management; Proceedings of the Identity, Reference, and the Web Workshop (IRW06), May 23-26, 2006, Edinburgh, Scotland.

Lik Mui et al., A Computational Model of Trust and Reputation, Proceedings of the 35th Annual Hawaii International Conference on System Sciences (HICSS'02), Jan. 7-10, 2002, vol. 7, p. 188, IEEE Computer Society, Washington, DC, USA.

Duncan J. Watts et al., Identity and Search in Social Media, Science, Apr. 2, 2002, p. 1302-1305, vol. 296.

* cited by examiner

RELATIONSHIP BASED PRESENCE INDICATING IN VIRTUAL AREA CONTEXTS

CROSS-REFERENCE TO RELATED APPLICATIONS

Under 35 U.S.C. §119(e), this application claims the benefit of U.S. Provisional Application No. 61/381,956, filed Sep. 11, 2010, the entirety of which is incorporated herein by reference.

BACKGROUND

When face-to-face communications are not practical, people often rely on one or more technological solutions to meet their communications needs. These solutions typically are designed to simulate one or more aspects of face-to-face communications. Traditional telephony systems enable voice communications between callers. Instant messaging (also referred to as "chat") communications systems enable users to communicate text messages in real time through instant message computer clients that are interconnected by an instant message server. Some instant messaging systems additionally allow users to be represented in a virtual environment by user-controllable graphic objects (referred to as "avatars"). Interactive virtual reality communication systems enable users in remote locations to communicate over multiple real-time channels and to interact with each other by manipulating their respective avatars in multi-dimensional virtual spaces.

The presence state of a communicant usually indicates the availability of the communicant to communicate or otherwise interact with others. Some instant messaging systems allow a user to set his or her presence state by selecting a presence indicator from a predetermined list of indicators (e.g., "here", "busy", "out-of-office", "do not disturb"). Some instant messaging systems also may automatically set the user's presence state to "idle" or "away" depending on whether activity on the user's computer terminal is detected. The instant messaging systems typically broadcast the user's presence state to other communicants (e.g., communicants on the user's "buddy list") who should receive updates regarding the user's presence state.

What are needed are improved systems and methods for indicating and managing presence.

DETAILED DESCRIPTION

Figure 1:
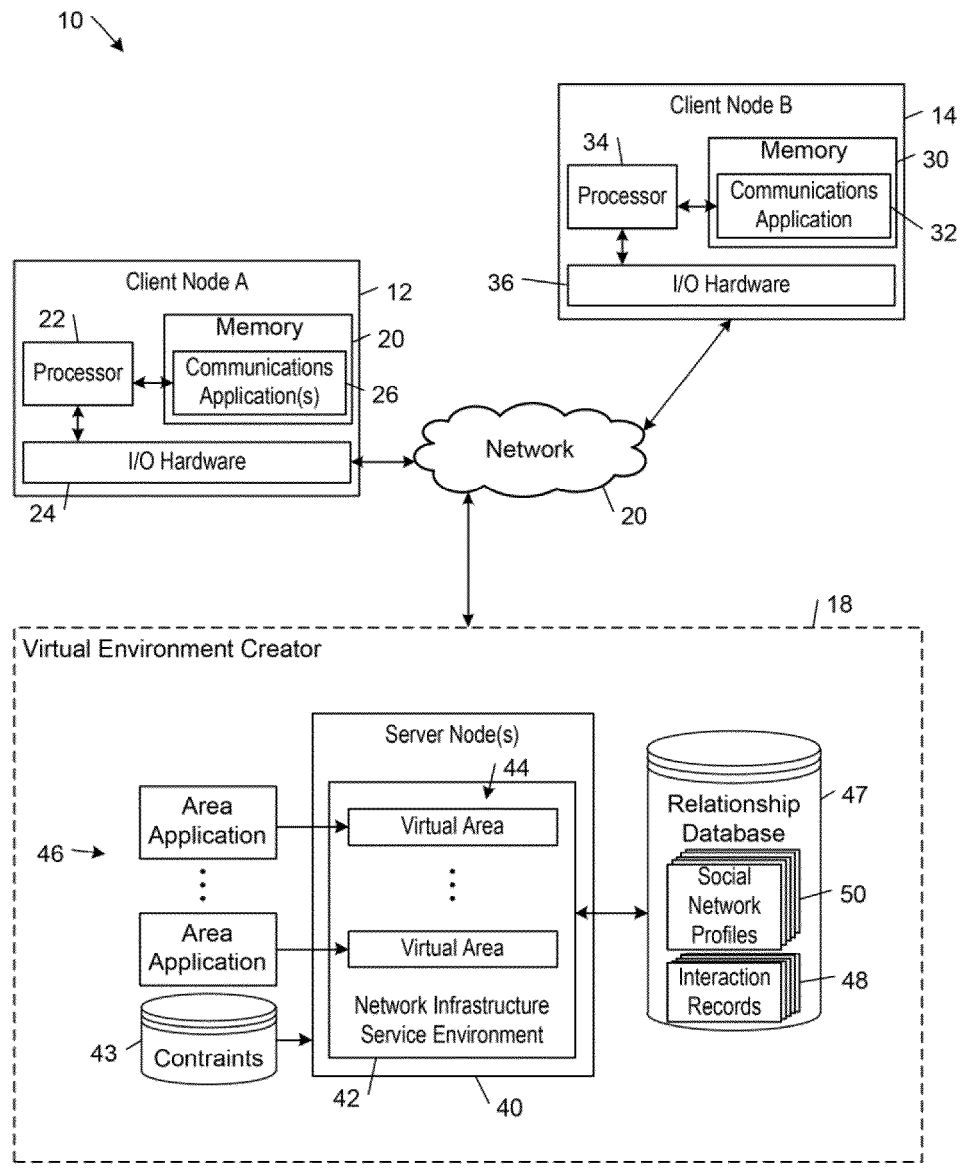
FIG. 1 is a diagrammatic view of an exemplary embodiment of a network communications environment that includes a first client network node, a second client network node, and one or more server nodes.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. DEFINITION OF TERMS

A "communicant" is a person who communicates or otherwise interacts with other persons over one or more network connections, where the communication or interaction may or may not occur in the context of a virtual area. A "user" is a communicant who is operating a particular network node that defines a particular perspective for descriptive purposes.

A "contact" of a user is a communicant or other person that is connected to the user by either an explicit social network tie that is declared by at least one of the user and the contact (and optionally confirmed by the other) or by a social network tie that is inferred from interactions between the user and the person.

A "communicant interaction" is any type of direct or indirect action or influence between a communicant and another network entity, which may include for example another communicant, a virtual area, or a network service. Exemplary types of communicant interactions include communicants communicating with each other in realtime, a communicant entering a virtual area, and a communicant requesting access to a resource from a network service.

A "social network" is a social structure or map of nodes that are connected by one or more types of interdependency. The "nodes" represent individual entities (e.g., individual communicants, groups of communicants, or organizations) in the network. A social network "tie" represents a relationship between a pair of entities in a social network. The nodes may be interconnected by a variety of different types of ties. A social network "profile" is a set of data that are associated with a single user. These data may include attributes that identify the user (e.g., user name, age, gender, geographic location), attributes that identify the user's friends and acquaintances, attributes that identify the user's interests (e.g., favorite music, books, movies, sports, foods), and attributes that specify the user's preferences (e.g., restrictions on how the system controls access to resources that are associated with the user).

A "computer" is any machine, device, or apparatus that processes data according to computer-readable instructions that are stored on a computer-readable medium either temporarily or permanently. A "computer operating system" is a software component of a computer system that manages and coordinates the performance of tasks and the sharing of computing and hardware resources. A "software application" (also referred to as software, an application, computer software, a computer application, a program, and a computer program) is a set of instructions that a computer can interpret and execute to perform one or more specific tasks. A "computer data file" is a block of information that stores data for use by a software application.

A "window" is a visual area of a display that typically includes a user interface. A window typically displays the output of a software process and typically enables a user to input commands or data for the software process. A window that has a parent is called a "child window." A window that has no parent, or whose parent is the desktop window, is called a "top-level window." A "desktop" is a system-defined window that paints the background of a graphical user interface (GUI) and serves as the base for all windows displayed by all software processes.

A "database" is an organized collection of records that are presented in a standardized format that can be searched by computers. A database may be stored on a single computer-readable data storage medium on a single computer or it may be distributed across multiple computer-readable data storage media on one or more computers.

A "data sink" (referred to herein simply as a "sink") is any of a device (e.g., a computer), part of a device, or software that receives data.

A "data source" (referred to herein simply as a "source") is any of a device (e.g., a computer), part of a device, or software that originates data.

A "network node" (also referred to simply as a "node") is a junction or connection point in a communications network. Exemplary network nodes include, but are not limited to, a terminal, a computer, and a network switch. A "server" network node is a host computer on a network that responds to requests for information or service. A "client" network node is a computer on a network that requests information or service from a server. A "network connection" is a link between two communicating network nodes. The term "local network node" refers to a network node that currently is the primary subject of discussion. The term "remote network node" refers to a network node that is connected to a local network node by a network communications link. A "connection handle" is a pointer or identifier (e.g., a uniform resource identifier (URI)) that can be used to establish a network connection with a communicant, resource, or service on a network node. A "network communication" can include any type of information (e.g., text, voice, audio, video, electronic mail message, data file, motion data stream, and data packet) that is transmitted or otherwise conveyed from one network node to another network node over a network connection.

A "resource" refers to any type of information (e.g., a web page, a file, streaming data, and presence data) or service (e.g., a service that establishes a communications link with another user) that is accessible over a network. A resource may be identified by a uniform resource identifier (URI).

A "communicant interaction" is any type of direct or indirect action or influence between a communicant and another network entity, which may include for example another communicant, a virtual area, or a network service. Exemplary types of communicant communications include communicants communicating with each other in realtime, a communicant entering a virtual area, and a communicant requesting access to a resource from a network service.

"Presence" refers to the ability and willingness of a networked entity (e.g., a communicant, service, or device) to communicate, where such willingness affects the ability to detect and obtain information about the state of the entity on a network and the ability to connect to the entity.

A "realtime data stream" is data that is structured and processed in a continuous flow and is designed to be received with no delay or only imperceptible delay. Realtime data streams include digital representations of voice, video, user movements, facial expressions and other physical phenomena, as well as data within the computing environment that may benefit from rapid transmission, rapid execution, or both rapid transmission and rapid execution, including for example, avatar movement instructions, text chat, realtime data feeds (e.g., sensor data, machine control instructions, transaction streams and stock quote information feeds), and file transfers.

A "link" is a connection between two network nodes and represents the full bandwidth allocated by the two nodes for real-time communication. Each link is divided into channels that carry respective real-time data streams. Channels are allocated to particular streams within the overall bandwidth that has been allocated to the link.

A "virtual area" (also referred to as an "area" or a "place") is a representation of a computer-managed space or scene. Virtual areas typically are one-dimensional, two-dimensional, or three-dimensional representations; although in some embodiments a virtual area may correspond to a single point. Oftentimes, a virtual area is designed to simulate a physical, real-world space. For example, using a traditional computer monitor, a virtual area may be visualized as a two-dimensional graphic of a three-dimensional computer-generated space. However, virtual areas do not require an associated visualization to implement switching rules. A virtual area typically refers to an instance of a virtual area schema, where the schema defines the structure and contents of a virtual area in terms of variables and the instance defines the structure and contents of a virtual area in terms of values that have been resolved from a particular context.

A "virtual area application" (also referred to as a "virtual area specification") is a description of a virtual area that is used in creating a virtual environment. The virtual area application typically includes definitions of geometry, physics, and realtime switching rules that are associated with one or more zones of the virtual area.

A "virtual environment" is a representation of a computer-managed space that includes at least one virtual area and supports realtime communications between communicants.

A "zone" is a region of a virtual area that is associated with at least one switching rule or governance rule. A "switching rule" is an instruction that specifies a connection or disconnection of one or more realtime data sources and one or more realtime data sinks subject to one or more conditions precedent. A switching rule controls switching (e.g., routing, connecting, and disconnecting) of realtime data streams between network nodes communicating in the context of a virtual area. A governance rule controls a communicant's access to a resource (e.g., an area, a region of an area, or the contents of that area or region), the scope of that access, and follow-on consequences of that access (e.g., a requirement that audit records relating to that access must be recorded). A "renderable zone" is a zone that is associated with a respective visualization.

A "position" in a virtual area refers to a location of a point or an area or a volume in the virtual area. A point typically is represented by a single set of one-dimensional, two-dimensional, or three-dimensional coordinates (e.g., x, y, z) that define a spot in the virtual area. An area typically is represented by the three-dimensional coordinates of three or more coplanar vertices that define a boundary of a closed two-dimensional shape in the virtual area. A volume typically is represented by the three-dimensional coordinates of four or more non-coplanar vertices that define a closed boundary of a three-dimensional shape in the virtual area.

A "spatial state" is an attribute that describes where a user has presence in a virtual area. The spatial state attribute typically has a respective value (e.g., a zone_ID value) for each of the zones in which the user has presence.

A "communication state" is an attribute that describes a state of a respective communication channel over which a respective one of the communicants is configured to communicate.

In the context of a virtual area, an "object" (also sometimes referred to as a "prop") is any type of discrete element in a virtual area that may be usefully treated separately from the geometry of the virtual area. Exemplary objects include doors, portals, windows, view screens, and speakerphone. An object typically has attributes or properties that are separate and distinct from the attributes and properties of the virtual area. An "avatar" is an object that represents a communicant in a virtual area.

As used herein, the term "includes" means includes but not limited to, the term "including" means including but not limited to. The term "based on" means based at least in part on.

II. RELATIONSHIP BASED PRESENCE INDICATING IN VIRTUAL AREA CONTEXTS

The embodiments that are described herein provide improved systems and methods for indicating presence in a network communications environment. In particular, these embodiments combine rich presence signaling through virtual area based contextualization with relationship based communicant targeting to provide a unique personalized communication environment for each user. Each virtual area typically includes multiple zones that provide different contexts for the presence states of the user and other communicants in those zones. Each zone may be associated with one or more semantic signifiers (e.g., a textual label, a visual design, a spatial layout, or other elements) that connote a particular context from which other communicants can infer a respective multi-faceted presence state for each of the communicants who is present in the zone. In some embodiments, a spatial metaphor enriches the presence states within a zone with location-based cues, such as proximity of communicants to elements of the zone or proximity of communicants to each other. In some embodiments, a user is able to personalize a virtual area (or "personal space") with zones that provide different respective contexts for the presence states of the user and other communicants in those zones. In these embodiments, the user typically is able to associate each zone with a respective governance rule that defines predicates for controlling who receives indications of presence in the zone, who can establish a presence in the zone, and who can access resources associated with the zone.

FIG. 1 shows an embodiment of an exemplary network communications environment 10 that includes a first client network node 12 (Client Node A), a second client network node 14 (Client Network Node B), and a virtual environment creator 18 that are interconnected by a network 20. The network 20 may include any of a local area network (LAN), a metropolitan area network (MAN), and a wide area network (WAN) (e.g., the internet). The network 20 typically includes a number of different computing platforms and transport facilities that support the transmission of a wide variety of different media types (e.g., text, voice, audio, and video) between network nodes.

The first client network node 12 includes a tangible, non-transitory computer-readable memory 22 (e.g., a volatile or non-volatile RAM or ROM), a processor 24, and input/output (I/O) hardware 26 (including a display). The processor 24 executes at least one communications application 28 that is stored in the memory 22. The second client network node 14 typically is configured in substantially the same general way as the first client network node 12, with a tangible, non-transitory computer-readable memory 30 storing at least one communications application 32, a processor 34, and input/output (I/O) hardware 36 (including a display).

Each of the network nodes 12, 14 has a respective set of one or more sources and an exemplary set of one or more sinks. Each source is a device or component that originates data of a particular data stream content type and each sink is a device or component that receives data of a particular data stream content type. A source and a sink of the same data stream content type are referred to herein as being "complementary." Exemplary sources include an audio source (e.g., an audio capture device, such as a microphone), a video source (e.g., a video capture device, such as a video camera), a chat source (e.g., a text capture device, such as a keyboard), a motion data source (e.g., a pointing device, such as a computer mouse), and other sources (e.g., file sharing source or a source of a customized real-time data stream). Exemplary sinks include an audio sink (e.g., an audio rendering device, such as a speaker or headphones), a video sink (e.g., a video rendering device, such as a display monitor), a chat sink (e.g., a text rendering device, such as a display monitor), a motion data sink (e.g., a movement rendering device, such as a display monitor), and other sinks (e.g., a printer for printing shared files, a device for rendering real-time data streams different from those already described, or software that processes real-time streams for analysis or customized display).

Each source has an active state in which the source is available for originating data and an inactive state in which the source is not available for originating data. Likewise, each sink has an active state in which the sink is available for receiving data and an inactive state in which the sink is not available for receiving data. The states of the sources and sinks typically can be controlled by the communicants operating the client nodes 12, 14 via controls provided by the communications applications 28, 32. For example, in some embodiments, the communications applications 28, 32 provide user controls for turning on/off the local microphones and the local speakers (e.g., headsets) on the client network nodes 12, 14.

In the illustrated embodiment, the virtual environment creator 18 includes at least one server network node 40 that provides a network infrastructure service environment 42 that manages sessions of the first and second client nodes 12, 14 in one or more virtual areas 44 in accordance with respective virtual area applications 46. Each of the virtual area applications 46 is hosted by a respective one of the virtual areas 44 and includes a description of the respective virtual area 44. Communicants respectively operating from the client nodes 12, 14 connect to the area applications 46 through the communications applications 28, 32.

The network infrastructure service environment 42 typically includes one or more network infrastructure services that cooperate with the communications applications 26, 32 in the process of establishing and administering network connections between the client nodes 12, 14 and other network nodes. Among the network infrastructure services that are included in the exemplary embodiment of the network infrastructure service environment 42 are an account service, a security service, an area service, a rendezvous service, and an interaction service. The structure, operation, and components of an exemplary embodiment of a network infrastructure service environment is described in U.S. patent application Ser. No. 12/825,512, filed Jun. 29, 2010, the entirety of which is incorporated herein by reference.

The network infrastructure service environment 42 typically maintains a relationship database 47 that contains records 48 of interactions between communicants and social network profiles 50 that are associated with respective communicants. Each interaction record 48 describes the context of an interaction between a pair of communicants. Each social network profile 50 typically includes: identity characteristics (e.g., name, age, gender, and geographic location information the communicant's current city) that describe a respective communicant or a persona that is assumed by the communicant; explicit relationship information that is declared by the communicant; and relationship information that is inferred from the communicant's interactions in the network communication environment 10.

The communications applications 28, 32, the area applications 46, and the network infrastructure service environment 42 together provide a platform (referred to herein as "the platform") that administers the realtime connections with network nodes in a communication context that is defined by an instance of a virtual area subject to a set of constraints 43 that control access to the virtual area instance. The communications applications 26, 32 operating on the first and second client network nodes 12, 14 present respective views of the virtual areas 44 in accordance with data received from the network infrastructure service environment 42 and provide respective interfaces for receiving commands from the communicants and providing a spatial interface that enhances the realtime communications between the communicants. The communicants typically are represented in the virtual areas 44 by respective avatars (e.g., sprites), which typically move about the virtual areas 44 in response to commands that are input by the communicants at their respective network nodes. In some embodiments, the communications applications 26, 32 establish realtime data stream connections between the first and second client network nodes 12, 14 and other network nodes sharing the virtual area 308 based on the positions of the communicants' avatars in the virtual areas 44.

The communications applications 28, 32 respectively operating on the client nodes 12, 14 typically include software and hardware resources which, together with administrative policies, user preferences (including preferences regarding the exportation of the user's presence and the connection of the user to the area applications 46 and other communicants), and other settings, define a local configuration that influences the administration of realtime connections with other network nodes.

The network connections between network nodes may be arranged in a variety of different stream handling topologies, including a peer-to-peer architecture, a server-mediated architecture, and hybrid architectures that combine aspects of peer-to-peer and server-mediated architectures.

In some embodiments, the server network node(s) 40 remotely manage client communication sessions and remotely configure audio and graphic rendering engines on the client network nodes 12, 14, as well as switching of data streams by sending instructions (also referred to as definitions) from the remotely hosted area applications 46 to the client network nodes in accordance with the stream transport protocol described in U.S. patent application Ser. No. 12/825, 512, filed Jun. 29, 2010, the entirety of which is incorporated herein by reference. In some of these embodiments, the server node(s) 40 send to each of the client nodes 12, 14 provisioning messages that configure the client nodes 12, 14 to interconnect respective data streams between active ones of their complementary sources and sinks in accordance with switching rules specified in the server applications 46.

The platform tracks communicants' realtime availabilities and activities across the different communication contexts that are defined by the area applications 46. This information is presented to the communicants in the form of realtime visualizations that enable the communicants to make more informed network interaction decisions (e.g., when to interact with a contact) and encourages the communicants to initiate interactions with other communicants and to join contexts (e.g., an ongoing conversation between communicants) of which the communicants otherwise would not have been aware. In some embodiments, the realtime visualization includes visual cues as to the presence and activities of the communicants in the contexts of the server applications. The presentation of these visual cues typically depends on one or more of governance rules associated with the virtual areas 44, administrative policies, and user preferences (including preferences regarding the exportation of the user's presence and the connection of the user to areas and other communicants), which may define tiered relationship based predicates that control access to presence information and/or resources on a zone-by-zone basis.

Figure 2:
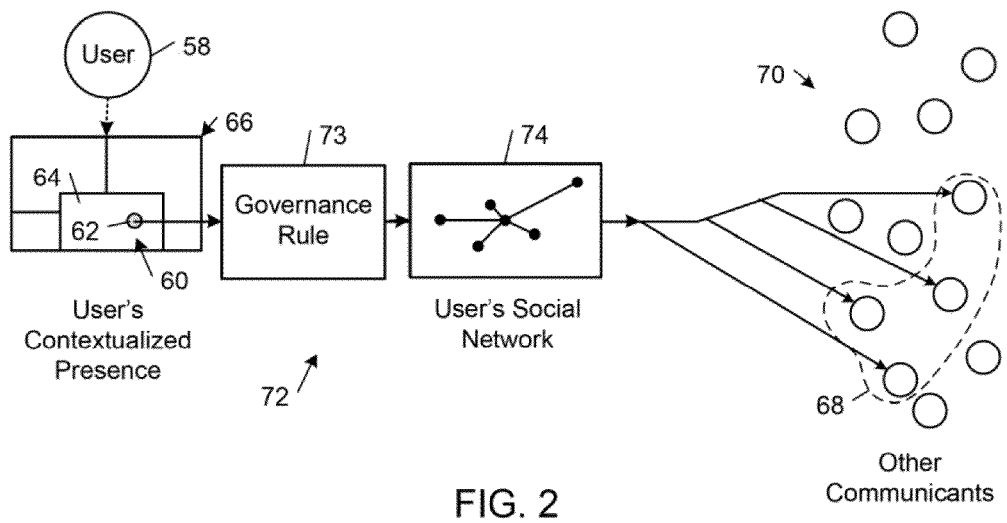
FIG. 2 is a diagrammatic view of a user's contextualized presence being broadcasted to a target set of communicants in accordance with an exemplary embodiment of the invention.

Referring to FIG. 2, in some embodiments, a user 58 has a presence 60 that is contextualized by the type of the virtual area 66 in which the user is located (indicated by the avatar 62 in FIG. 2) and by the particular zone 64 of that virtual area. An indication of the user's contextualized presence 60 is selectively broadcasted to a target set 68 of other communicants 70 by filtering the user's presence 60 through a social network filter 72 for the particular zone 64 in which the user is present. In these embodiments, the social network filter 72 typically is implemented by a user-configurable governance rule 73 that is applied to the user's social network 74. The governance rule defines one or more conditions on one or more communicant attributes (e.g., types and strengths of relationship ties with the user) that filter out all the other communicants except the target set 68 of communicants who satisfy the governance rule. In some embodiments, the governance rules 73 that control communicant access to information relating to the zone (e.g., the level of presence detail that is available to a communicant before the communicant establishes a presence in the area), access to the zone, or access to resources associated with the zone.

Figure 3:
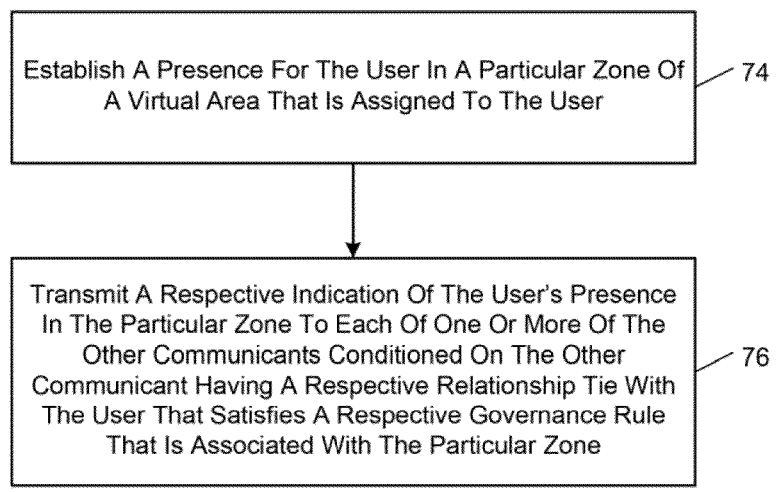
FIG. 3 is a flow diagram of an exemplary embodiment of a method of transmitting a user's contextualized presence to a target set of communicants.
Figure 4:
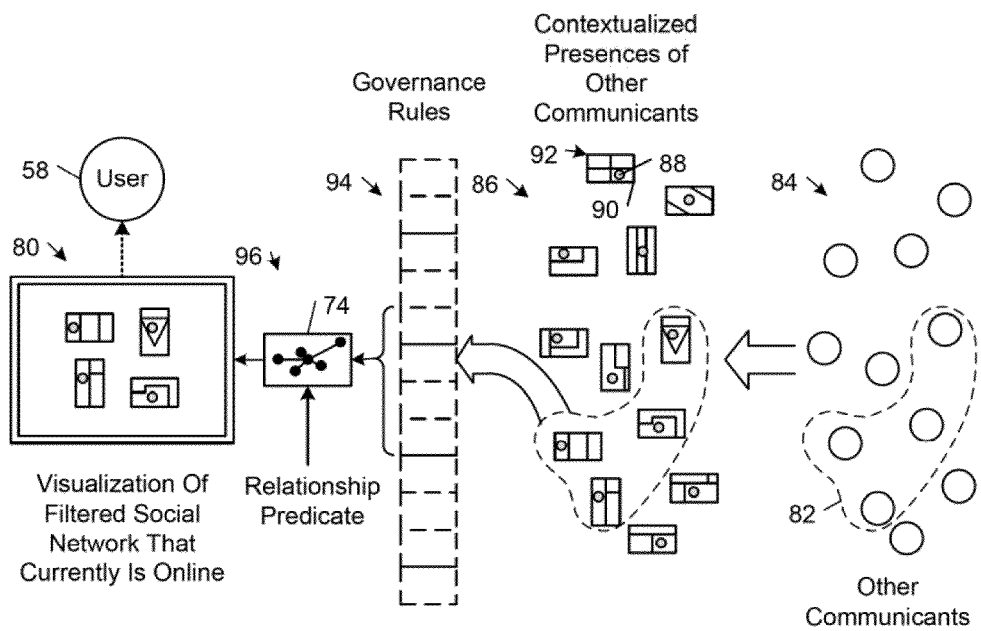
FIG. 4 is a diagrammatic view of a user receiving contextualized presences from a target set of communicants in accordance with an exemplary embodiment of the invention.

FIG. 3 shows an embodiment of a method by which the platform performs relationship based broadcasting of the user's contextualized presence 60 to the target set 68 of other communicants 70. In accordance with this method, the platform establishes a presence for the user in a particular one of multiple zones of a virtual area that is assigned to the user (FIG. 3, block 74). In this process, the platform typically defines a location for the user in a spatial layout of the zones described by a virtual area specification associated with the virtual area. The platform transmits a respective indication of the user's presence in the particular zone to each of one or more of the other communicants 70 conditioned on the other communicant having a respective relationship tie with the user that satisfies a respective governance rule that is associated with the particular zone (FIG. 3, block 76). In this process, the platform typically transmits the defined location of the user in the particular zone to the target set 68 of other communicants. The platform also typically transmits to the target set of other communicants 68 at least one of: a respective indication of presence of each of the communicants who is present in the zone; an indication of an activity occurring the zone; and indication of an interaction between ones of the communicants in the zone Referring to FIG. 4, in some embodiments, the user 58 is presented with a personalized visualization 80 of the presence states of a target set 82 of other communicants 84 who are present in one or more virtual areas in the network communications environment. In these embodiments, each of the other communicants 84 can have a respective presence 86 that is contextualized by the particular zone 90 of a respective virtual area 92 in which the communicant is located (indicated by a respective avatar 88 in FIG. 4). Indications of the contextualized presences 86 of the target set 82 of the other communicants 84 are selectively filtered through an optional set of governance rules 94 that respectively are associated with the particular zones in which the other communicants are present, and a social network filter 96 that is associated with the user 58. In these embodiments, the social network filter 96 typically is implemented by applying to the user's social network 74 a particular relationship predicate that defines one or more conditions on one or more communicant attributes (e.g., types and strengths of relationship ties with the user) so that only the indications of the contextualized presences 86 of the target set 82 of the other communicants are included in the visualization 80.

In some of these embodiments, the presence states of the other communicants 84 also are filtered by virtual area type. In this way, only the presence states of communicants in one or more designated types of virtual areas (e.g., personal spaces, public spaces, work spaces, gaming spaces, and other types) are candidates for presentation in the visualization 80. This type of filtering provides additional context for inferring the current state of availability of the other communicants.

Figure 5:
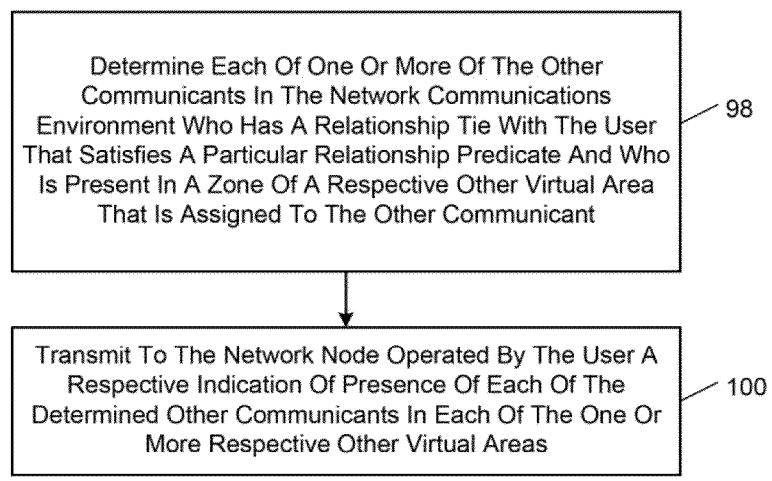
FIG. 5 is a flow diagram of an exemplary embodiment of a method of receiving contextualized presences of a target set of communicants.

FIG. 5 shows an embodiment of a method by which the platform performs relationship based filtering of the other communicant's contextualized presences 86. In accordance with this method, the platform determines each of one or more of the other communicants in the network communications environment who has a relationship tie with the user that satisfies a particular relationship predicate and who is present in a respective other virtual area that is assigned to the other communicant (FIG. 5, block 98). The platform transmits to the network node operated by the user a respective indication of presence of each of the determined other communicants in each of the one or more respective other virtual areas (FIG. 5, block 100).

In the embodiment of FIG. 5, the presence states of the other communicants 84 are filtered by requiring that the virtual areas in which the other communicants are present be assigned to the other communicants. In some embodiments, each of such virtual areas corresponds to a personal virtual area (or space) that is assigned to a single respective one of the other communicants who is able to manage aspects of the personal virtual area (e.g., configure zone specific governance rules, configure the visual appearance or layout of the zones, and manage the props that are available in each of the zones).

As explained above, the platform administers the realtime connections between network nodes in communication contexts that are defined by respective instances of one or more virtual areas 44. A virtual area instance may correspond to an abstract virtual space that is defined with respect to abstract coordinates (e.g., coordinates that are defined by positions in the associated computer data file or software application, or in an embodiment in which a customer service database is an area, each record in the database constitutes a zone). Alternatively, a virtual area instance may correspond to a visual virtual space that is defined with respect to one-, two- or three-dimensional geometric coordinates that are associated with a particular visualization. Abstract virtual areas may or may not be associated with respective visualizations, whereas visual virtual areas are associated with respective visualizations.

A virtual area typically includes one or more zones that are associated with respective rules that govern the switching of realtime data streams between the network nodes that are represented by the avatars in the virtual area. The switching rules dictate how local connection processes executing on each of the network nodes establishes communications with the other network nodes based on the locations of the communicants' avatars in the zones of the virtual area. A virtual area typically is defined by a specification that includes a description of geometric elements of the virtual area and one or more rules, including switching rules and governance rules. The switching rules govern realtime stream connections between the network nodes. The governance rules control a communicant's access to resources, such as the virtual area itself, regions with the virtual area, and objects within the virtual area.

In some embodiments, governance rules are associated with a virtual area to control who has access to the virtual area, who has access to its contents, what is the scope of that access to the contents of the virtual area (e.g., what can a user do with the contents), and what are the follow-on consequences of accessing those contents (e.g., record keeping, such as audit logs, and payment requirements). In some embodiments, an entire virtual area or a zone of the virtual area is associated with a "governance mesh." In some embodiments, a governance mesh is implemented in a way that is analogous to the implementation of the zone mesh described in U.S. Pat. No. 7,769,806. A governance mesh enables a software application developer to associate governance rules with a virtual area or a zone of a virtual area. This avoids the need for the creation of individual permissions for every file in a virtual area and avoids the need to deal with the complexity that potentially could arise when there is a need to treat the same document differently depending on the context.

In some embodiments, a virtual area is associated with a governance mesh that associates one or more zones of the virtual area with a digital rights management (DRM) function. The DRM function controls access to one or more of the virtual area or one or more zones within the virtual area or objects within the virtual area. The DRM function is triggered every time a communicant crosses a governance mesh boundary within the virtual area. The DRM function determines whether the triggering action is permitted and, if so, what is the scope of the permitted action, whether payment is needed, and whether audit records need to be generated. In an exemplary implementation of a virtual area, the associated governance mesh is configured such that if a communicant is able to enter the virtual area he or she is able to perform actions on all the documents that are associated with the virtual area, including manipulating the documents, viewing the documents, downloading the documents, deleting the documents, modifying the documents and re-uploading the documents. In this way, the virtual area can become a repository for information that was shared and discussed in the context defined by the virtual area.

Additional details regarding the specification of a virtual area are described in U.S. Patent Application Publication No. 2009/0254843 and U.S. Pat. No. 7,769,806.

Some embodiments of the platform enable software application designers to define the semantics of position in a software application or a computer data file. Through associations with respective connection rules, these position definitions can be used, for example, to drive connections to virtual areas, entries into virtual areas, connections to communicants and other sources or sinks of realtime data streams, and determinations of presence data relating to communicants, network resources, and network services. Exemplary embodiments of systems and methods of defining the semantics of position in a software application or a computer data file are described in U.S. Patent Application Publication No. 2010/0142542.

In some embodiments, a user is able to personalize a virtual area with zones that provide different respective contexts for the presence states of the user and other communicants on those zones. In this regard, in addition to governance rules that a might be defined by the associated virtual area application 46, the user typically is able to associate one or more of the zones of the virtual area 44 with a respective governance rule that defines predicates for controlling who receives indications of presence in the zone, who can establish a presence in the zone, and who can access resources associated with the zone. In some embodiments, the platform configures the virtual area based on configuration information received from the user. For example, the platform may change one or more geometric elements of the virtual area in response to the instruction received from the user. This process may include one or more of: adding a zone to the virtual area; deleting one or more of the zones of the virtual area; spatially rearranging one or more of the zones of the virtual area; adding to each of one or more of the zones a respective prop that is associated with a respective network service; and deleting from each of one or more of the zones a respective prop that is associated with a respective network service.

Each virtual area typically includes multiple zones that provide different contexts for the presence states of the user and other communicants on those zones. Each zone may be associated with one or more semantic signifiers (e.g., a textual label, a visual design or a spatial layout, or other elements) that connote a particular context from which other communicants can infer a multi-dimensional presence state for the communicants who are present in the zone. In some embodiments, a spatial metaphor enriches the presence states within a zone with location-based cues, such as proximity of communicants to elements of the zone or proximity of communicants to each other.

Figure 6:
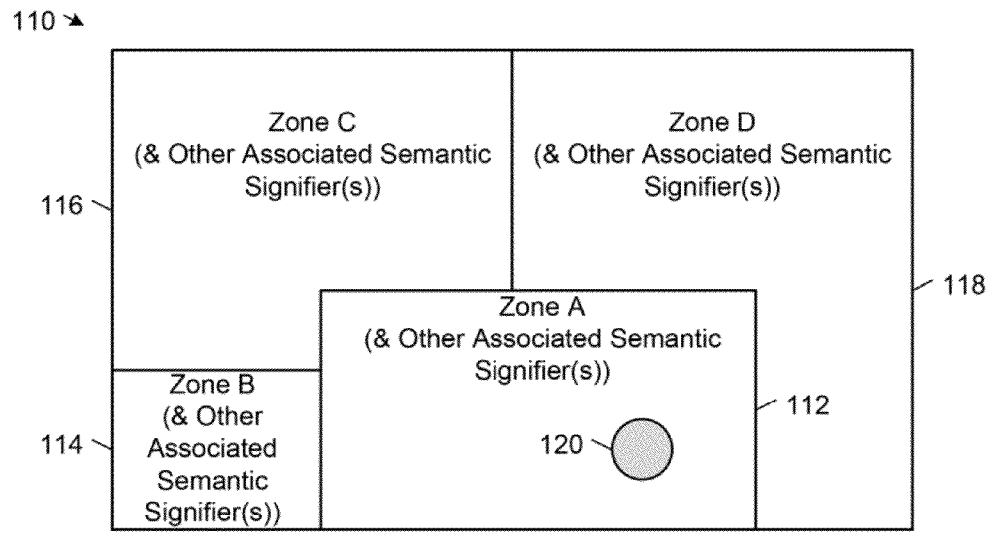
FIG. 6 is a diagrammatic view of an exemplary embodiment of a virtual area.

FIG. 6 shows an exemplary embodiment of a virtual area 110 that includes four zones 112, 114, 116, 118 (respectively labeled Zone A, Zone B, Zone C, and Zone D), and an avatar 120 that is positioned in the zone 112. Each of the zones 112-118 includes one or more semantic signifiers (e.g., a textual label, a visual design or a spatial layout, or other elements, such as props and other objects) that connote a particular context from which other communicants can infer a detailed presence state for the communicants who are present in the zone. For example, based on the position of the sprite 120 in Zone A of the virtual area 110, other communicants who receive indications of the presence of sprite 120 in Zone A can infer that the communicant associated with the sprite 120 has a state of mind or is engaged in an activity or is available to communicate to an extent that is connoted by the semantics of the label Zone A and the other semantic signifiers that are associated with Zone A.

Figure 7:
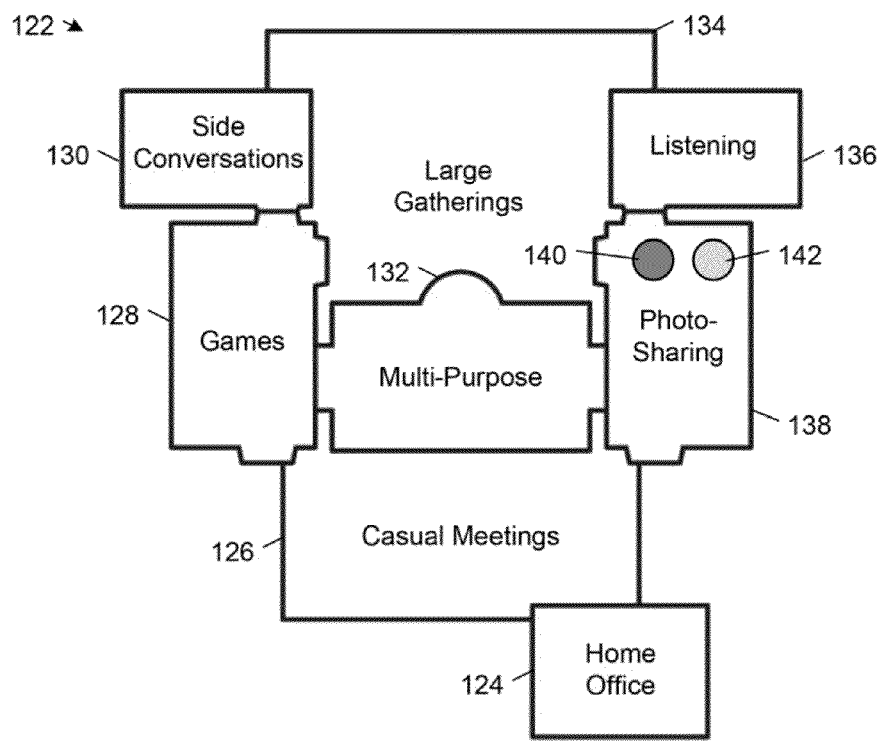
FIG. 7 is a diagrammatic view of an exemplary embodiment of a virtual area.

FIG. 7 shows an exemplary embodiment of another virtual area 122 that includes eight zones 124, 126, 128, 130, 132, 134, 136, 138 that respectively are labeled with the following textual signifiers that assign different respective functions or communicant activities to the zones: Home Office, Casual Meetings, Games, Side Conversations, Multi-Purpose, Large Gatherings, Listening, and Photo-Sharing. In addition, the virtual area 122 has an overall shape that is suggestive of a residence, and the individual zones 124-138 have respective shapes that are suggestive of rooms of a residence. Based on these semantic signifiers, a communicant can infer a detailed presence state of a user from the location of the user's sprite 140 in the virtual area 122. For example, a particular communicant receiving an indication of the presence of the user's sprite 140 in close proximity with another communicant's sprite 142 in the Photo-Sharing zone 138 is likely to infer that the user probably is sharing photos with the other communicant. Based on this contextualization of the user's presence, the particular communicant can make a more informed decision about whether or not to interact with the user at the current time. In this example, the appearance of the Photo-Sharing zone 138 and the proximity of the communicants' avatars 140, 142 enrich the presence signaling by providing spatial cues that the other communicants can comprehend intuitively.

In the exemplary embodiments shown in FIGS. 6 and 7, the virtual areas 110, 122 are visual virtual spaces that are associated with respective two-dimensional visualizations.

Figure 8:
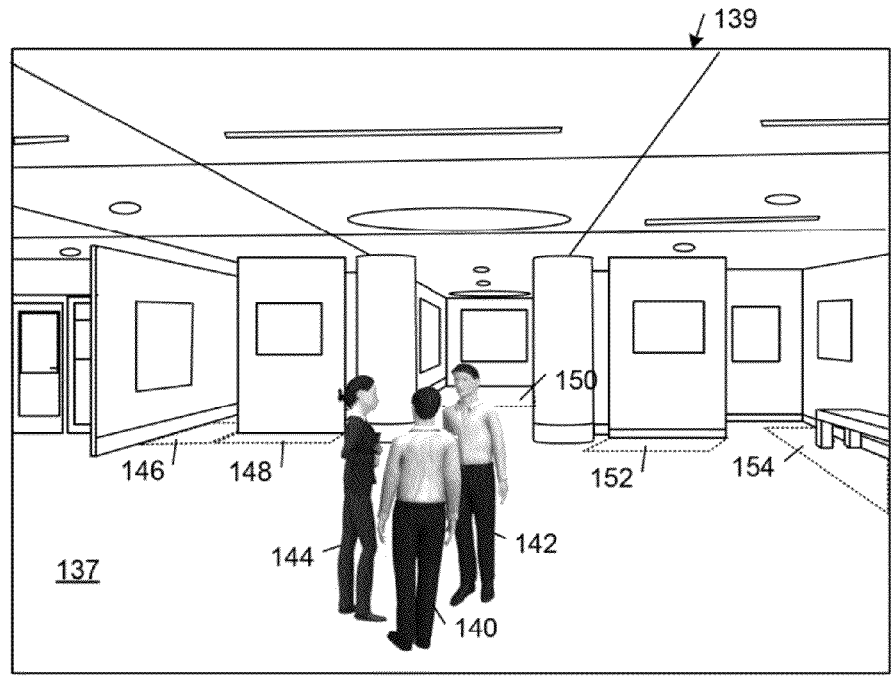
FIG. 8 is a diagrammatic view of an exemplary embodiment of a virtual area.

FIG. 8 shows an exemplary embodiment of a virtual area 137 that is associated with a three-dimensional visualization 139 representing a room of a building (e.g., a photo-sharing room). Communicants are represented in the virtual area 139 by respective avatars 140, 142, 144. The virtual area 137 includes zones 146, 148, 150, 152, 154 that are associated with respective rules that govern the switching of realtime data streams between the network nodes that are represented by the avatars 140-144 in the virtual area 139. (During a typical communication session, the dashed lines demarcating the zones 146-154 in FIG. 8 are not visible to the communicants although there may be visual cues associated with such zone boundaries.) The switching rules dictate how local connection processes executing on each of the network nodes establishes communications with the other network nodes based on the locations of the communicants' avatars 140-144 in the zones 146-154 of the virtual area 137.

Figure 9A:
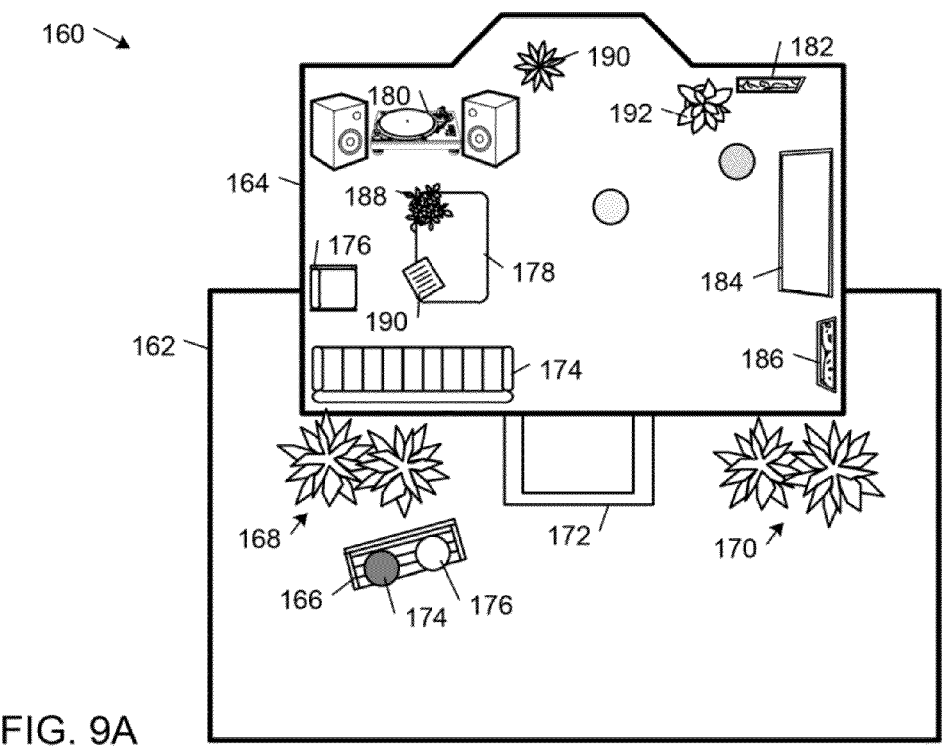
FIGS. 9A and 9B are diagrammatic views of an exemplary embodiment of a virtual area.

FIG. 9A shows an exemplary embodiment of a virtual area 160 that is associated with a two-dimensional visualization of an outer courtyard zone 162 and a residential room zone 164. Each of the zones 162, 164 contains objects and visual embellishments that suggest the intended function of the zone.

For example, the outer courtyard zone 162 contains a bench object 166, plant embellishments 168, 170, and a threshold embellishment 172. The bench object 166 connotes activities or states of mind that typically are associated with sitting. For example, other communicants who receive indications of the presences of sprites 174, 176 on the bench object 166 might infer that the communicants associated with those sprites are conversing privately or perhaps waiting for another communicant to enter the zone. The plant embellishments 168, 170 and the threshold embellishment 172 provide additional visual cues indicating the nature of the zone 162 (i.e., that it is a courtyard).

The room zone 164 contains a couch object 174, a chair object 176, a table prop 178 supporting a document object 190, a sound system prop 180, viewscreen props 182, 184, a video system prop 186, and plant embellishments 188, 190, 192 that provide visual cues indicating the nature zone 164 (i.e., that it is a room of a residence). The couch object 174 and the chair object 176 connote activities or states of mind that typically are associated with sitting (e.g., private conversation, waiting, or reading a data file associated with the document object 190). The table prop 178 typically is associated with file share functionality of the platform that enables communicants to upload computer data files to server storage in association with the room zone 164 and to download data files that are associated with the room zone 164 from the server storage to the respective client network nodes. In embodiment shown in FIG. 9A, the document object 190 is associated with a computer data file that has been uploaded into the room zone 164. The document object 190 may be selected by a communicant (e.g., by double-clicking the document object 190 with an input device, such as a computer mouse) to initiate downloading of the associated computer data file to the communicant's client network node. The sound system prop 180 typically is associated with audio streaming functionality of the platform that enables communicants to stream audio content to their respective client network nodes. The viewscreen props 184 typically are associated with application sharing functionality of the platform that enables communicants to share applications operating on their respective client network nodes. The photo viewing prop 182, 186 typically are associated with a photo viewer that enables communicants to view a photograph residing on a server on their respective client network nodes. The video system prop 186 typically is associated with video streaming functionality of the platform that enables communicants to stream video content to their respective client network nodes. Additional details regarding the structure, function, and operation of interactive props, such as the table prop 178, the sound system prop 180, and the viewscreen props 184, may be obtained from U.S. patent application Ser. No. 12/354,709, filed Jan. 15, 2009, the entirety of which is incorporated herein by reference.

Figure 9B:
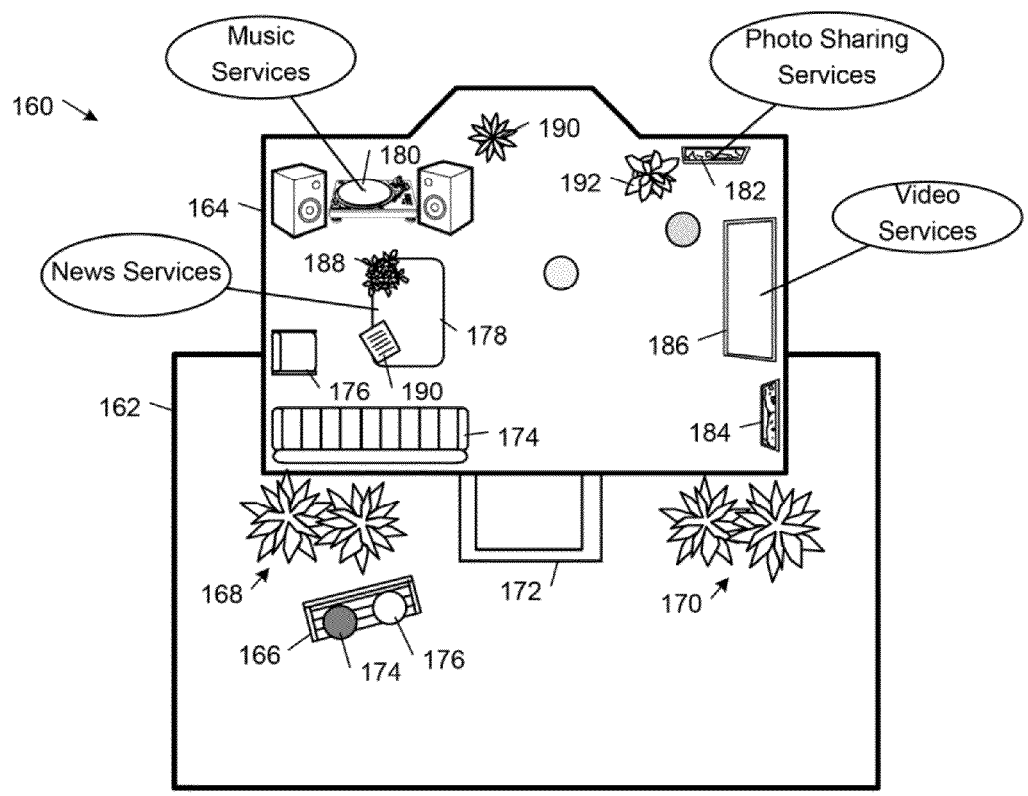

In some embodiments, one or more of the props in the room zone 164 are associated with a respective network service. Exemplary network services include an online content providing service, an online gaming service, an online social networking service, and an online shopping service. In one example, FIG. 9B shows an embodiment of the virtual area 160 in which the table prop 178 is associated with one or more news content delivery services (e.g., CNN, National Public Radio, New York Times, Wall Street Journal, and Wired magazine), the sound system prop 180 is associated with one or more music streaming services (e.g., Pandora Radio, iTunes, Slacker Radio), the photo viewing prop 182 is associated with one or more photo-sharing services (e.g., Facebook, Flickr, and Picasa), and the video system prop 186 is associated with one or more video streaming services (e.g., Hulu, YouTube, and Netflix). In these embodiments, the platform defines a connection between the network service and a communicant's network node in response to activation of the prop by the communicant. In some embodiments, an indication of activation of a prop is transmitted to the target set of one or more other communicants in association with the indications of the user's presence.

In addition to the presence contextualizing elements of the virtual areas discussed above, the platform provides additional presence state contextualizing cues in the form of indications of the states of various communication channels over which the communicants are configured to communicate. For example, the "on" or "off" state of a communicant's local speaker channel is depicted by the presence or absence of a headphones graphic on the communicant's graphic representation. When the speakers of a communicant are on, the headphones graphic is present and, when the communicant's speakers are off, the headphones graphic is absent. The "on" or "off" state of the communicant's microphone is depicted by the presence or absence of a microphone graphic on the communicant's graphic representation and a series of concentric circles that dynamically radiate away from the communicant's graphic representation in a series of expanding waves. When the microphone is on, the microphone graphic and the radiating concentric circles 68 are present and, when the microphone is off, the microphone graphic 67 and the radiating concentric circles are absent. The headphones graphic, the microphone graphic, and the radiating concentric circles serve as visual cues of the states of the communicant's sound playback and microphone devices. The activity state of a communicant's text chat channel is depicted by the presence or absence of an animated hand graphic adjacent the communicant's graphic representation. When a communicant is typing text chat data to another network node the hand graphic is present and animates, and when a communicant is not typing text chat data the hand graphic is not present. In some embodiments, text chat data is transmitted only when keyboard keys are depressed, in which case the visualization of the communicant's text chat channel appears as a flashing on and off of the hand graphic. From these visual cues, a communicant can infer whether or not a communicant available for communications and can infer whether or not a communicant currently is communicating with another communicant.

Exemplary embodiments of systems and methods of generating and displaying indications of the states of various communication channels over which the communicants are configured to communicate are described in U.S. patent application Ser. No. 12/354,709, filed Jan. 15, 2009.

As explained above, indications of a particular communicant's contextualized presence are selectively broadcasted to a target set of other communicants by filtering the user's presence through a social network filter for the particular zone. In these embodiments, the social network filter typically is implemented by a user-configurable governance rule that is applied to the user's social network. The governance rule defines one or more conditions on one or more communicant attributes (e.g., types and strengths of relationship ties with the user) that filter out all the other communicants except the target set 68 of communicants who satisfy the governance rule.

As defined above, a "social network" is a social structure or map of nodes that are connected by one or more types of interdependency, where the "nodes" represent individual entities (e.g., individual communicants, groups of communicants, or organizations) in the social network, and a social network "tie" is used to represent a relationship between a pair of entities in the social network.

Figure 10A:
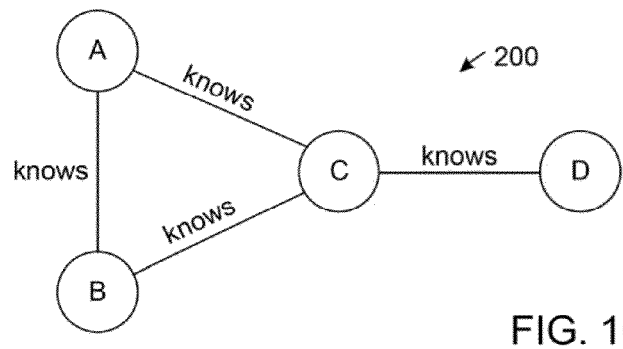
FIG. 10A is a diagrammatic view of an exemplary embodiment of a social network diagram showing a map of ties between a set of nodes.
Figure 10B:
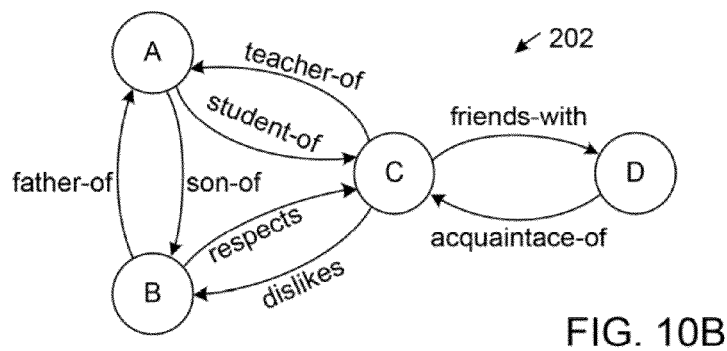
FIG. 10B is a diagrammatic view of an exemplary embodiment of a social network diagram showing a map of ties between a set of nodes.
Figure 10C:
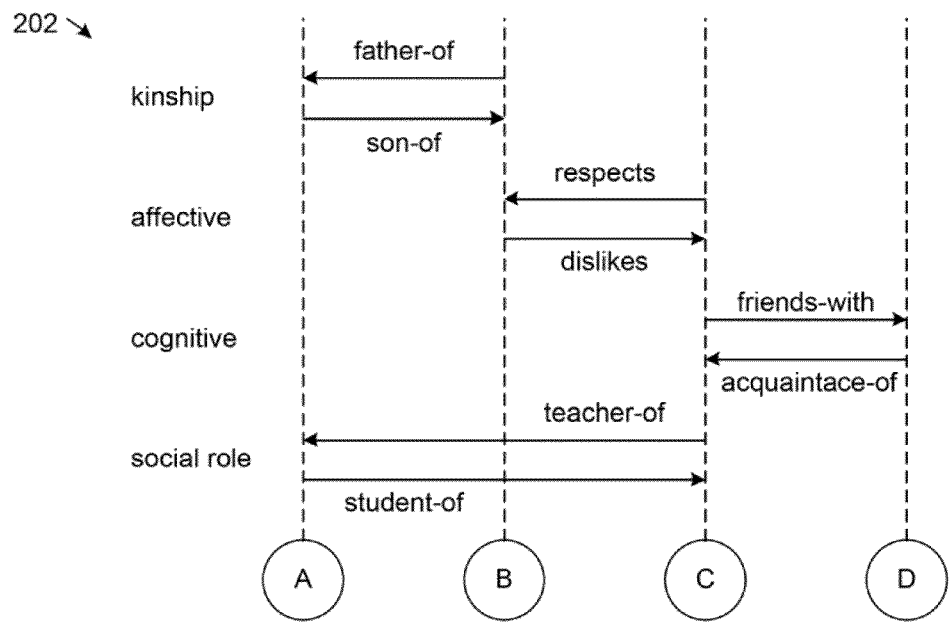
FIG. 10C is a diagrammatic view of an exemplary embodiment of a social network diagram that presents an alternative view of the mapping between the nodes of the social network diagram shown in FIG. 10B.

Each tie between a pair of the nodes in a social network may be associated with one or more relationship type values. Exemplary relationship types include a kinship type (e.g., father-of, cousin-of), an affective type (e.g., respects, likes), a cognitive type (e.g., knows, friends-with, acquaintance-of), and social role type (e.g., teacher-of, works-with). FIG. 10A shows an embodiment of a social network diagram 200 that represents communicants as nodes (also referred to as "vertices"), which are labeled A, B, C, D, and their mutual relationships as undirected ties or edges that connect one node to another, where each tie corresponds to the cognitive "knows" type of relationship. In this embodiment, communicants A, B, C respectively know each other, whereas node D only knows node C. FIGS. 10B and 10C show an embodiment 202 of the social network diagram 200 in which the relationships between the communicants A, B, C, D are represented as directed ties of different types. For example, communicants A and B are related by the kinship types of "son-of" and "father-of", respectively; communicants A and C are related by the role types of "student-of" and "teacher-of", respectively; communicants B and C are related by the affective types of "dislikes" and "respects", respectively; and communicants C and D are related by the cognitive types of "friends-with" and "acquaintance-of", respectively.

In some embodiments, the platform infers a relationship level attribute value for a social network tie from a statistical analysis of the results of queries on the relationship database 47. Each relationship level attribute value specifies a level of relationship between the user and another communicant. A separate relationship level may be derived for each relationship type that is associated with a social network tie between a pair of communicants. In some embodiments, the relationship level attribute value may correspond to a numerical value that is normalized to a particular scale (e.g., a number between zero and one).

Figure 11:
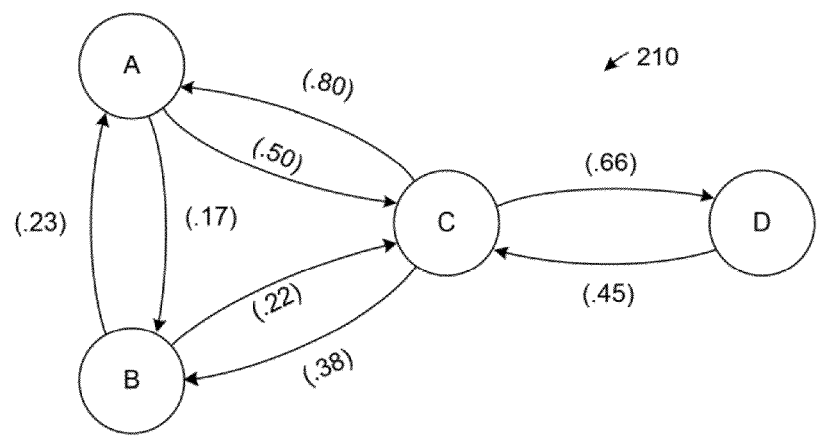
FIG. 11 is a diagrammatic view of an exemplary embodiment of a social network diagram showing a map of ties between a set of nodes.

For example, FIG. 11 shows an embodiment 210 of the social network diagram 200 (see FIG. 6A) in which each of the directed "knows" relationships between the communicants is associated with a respective relationship level attribute value that models how well one communicant knows another communicant. As shown by the social network diagram 202, the level at which a pair of communicants know each other need not be (and typically is not) the same. For example, in the social network diagram 202 communicant A knows communicant B at a level of 0.23, whereas communicant B knows communicant A at a level of 0.17. The relationship level attribute values typically are normalized to a particular range. For example, in the embodiment shown in FIG. 7, the relationship level attribute values are normalized to a range of [0,1]. In other embodiments, each relationship level attribute value corresponds to a class label that is selected from a relationship level taxonomy (e.g., a level of "friendship" taxonomy, such as: best friends, good friends, friends, acquaintances, hasn't met).

In some embodiments, the platform determines the level of relationship tie between the user and each of the respective ones of the other communicants based on a level of interactions between the user and the other communicant. For example, the level of relationship tie between the user and each of the respective ones of the other communicants may be determined based on one or more of: levels of interactions between the user and the other communicant over different respective communication channels; respective occurrence times of interactions between the user and the other communicant; and weights assigned to respective contexts in which the user and the other communicant have interacted. In some embodiments, the respective context of interaction between the user and the other communicant is defined by one or more of: a type of virtual area (e.g., public space, private space, work space) in which the user and the other communicant have interacted; and a type of relationship that is defined explicitly between the user and the other communicant.

Exemplary embodiments of systems and methods for determining relationship tie levels are described in U.S. patent application Ser. No. 12/631,026, filed Dec. 4, 2009 (published as U.S. Patent Application Publication No. 2010/0146118), the entirety of which is incorporated herein by reference.

A governance rule may define one or more conditions on one or more communicant attributes (e.g., a relationship type attribute that indicates a level of relationship with the user) that control communicant access to information relating to the zone and/or control communicant access to one or more resources associated with the zone (e.g., a computer data file associated with the zone). At least one of the conditions may correspond to a communicant having a relationship tie with the user that meets a threshold relationship type level in a hierarchical arrangement of relationship types ordered by level of relationship (e.g., intimacy or strength). The information relating to the zone may include one or more of: an indication of presence of the user in the zone; a respective indication of presence of each of the communicants who is present in the zone; an indication of activity occurring the zone; and indication of an interaction between ones of the communicants in the zone.

In some embodiments, the platform configures the governance rule that is respectively associated with a particular zone based on configuration information received from the user. In this process, the platform may respond to the configuration information received from the user, by setting in the governance rule a condition on access to information relating to the zone to a communicant having a relationship tie with the user that meets a threshold relationship type level in a hierarchical ordering of relationship types ordered by level of relationship.

Figure 12:
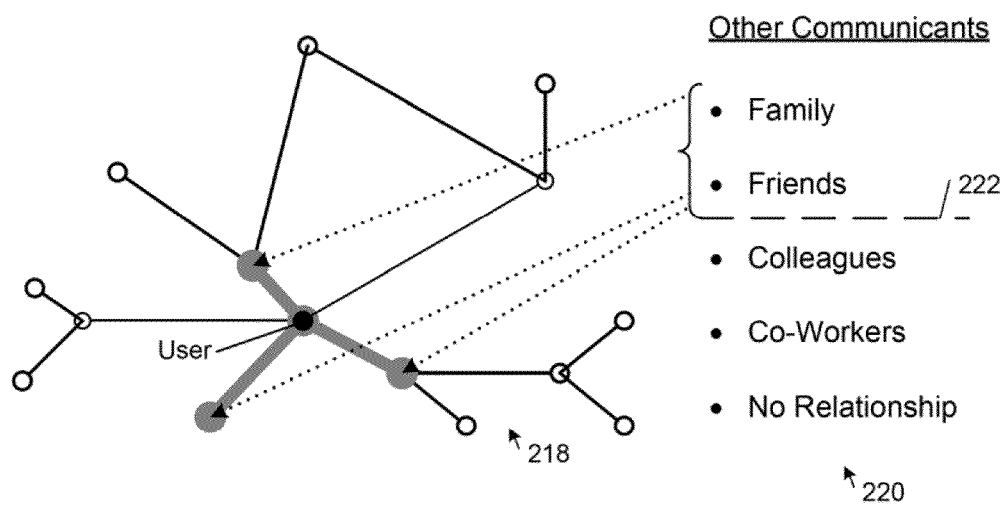
FIG. 12 is a diagrammatic view of an exemplary embodiment of a network diagram and an exemplary embodiment of a relationship type hierarchy.

FIG. 12 shows an exemplary social network diagram 218 and an exemplary relationship type hierarchy 220. The social network 218 consists of a set of circular nodes that are interconnected by respective linear segments, where the circular nodes represent communicants and the linear segments represent relationship ties between the communicants. The relationship type hierarchy 220 consists of a set of five relationship type attributes that are ordered by increasing relationship level (e.g., intimacy or strength) as follows: No Relationship; Co-Workers; Colleagues; Friends; and Family. In the example illustrated in FIG. 12, the threshold relationship type level 222 set by the relationship predicate is the "Friends" relationship type. Thus, in this example, the target set of communicants are the communicants in the user's social network 218 who have a level of relationship with the user of at least the Friends relationship type level in the relationship type hierarchy 220 (i.e., communicants that are Friends or Family). The target set of communicants is indicated in FIG. 12 by the highlighted portion of the social network 218 and the dashed arrows pointing from the target portion 222 of the relationship type hierarchy 220 to the respective nodes of the social network representing the target communicants.

Figure 13:
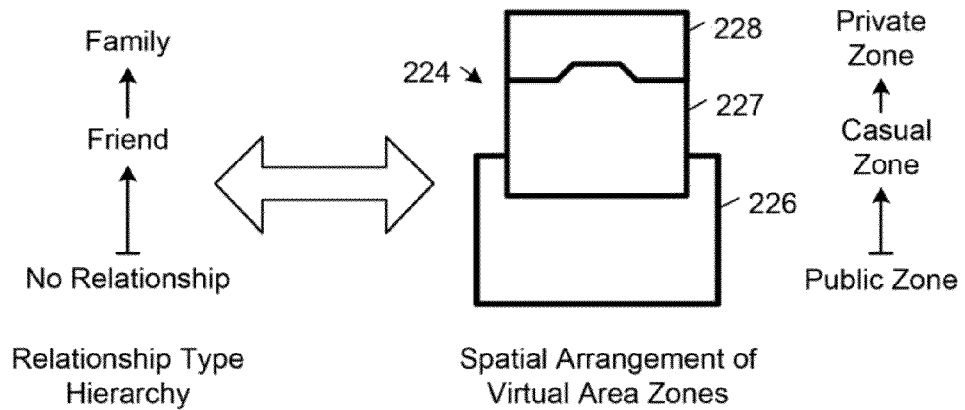
FIG. 13 is a diagrammatic view of a virtual area with zones that are ordered spatially according to different levels of relationship ties in a relationship type hierarchy.

In some embodiments, the zones of a virtual area are ordered spatially according to different levels of relationship ties with the user in the relationship type hierarchy. For example, in the exemplary embodiment shown in FIG. 13, the zones of the virtual area 224 are ordered spatially from a public zone 226, to a casual zone 227, to a private zone 228, which corresponds to the different levels of relationship ties with the user (i.e., no relationship, friend, and family) in the relationship type hierarchy. In this example, the zones 226, 228 of the virtual area 224 have an associated spatial arrangement in which the zones are arranged spatially according to the hierarchical ordering of the multiple zones. In another example, the multiple zones of the virtual area are clustered according to the different types of relationship ties with the user and the multiple zones of the virtual area have an associated spatial arrangement in which the zones are clustered according to the types of relationship. For example, the zones of a virtual area may be arranged spatially into a family cluster, a friends cluster, and a colleagues cluster, where the zones in each of these clusters are arranged according to relationship strength with the user, where the distance of each zone is positioned a distance away from the user's zone that increases with decreasing relationship strength.

In some embodiments, rich virtual area based presence signaling is combined with communicant-specific relationship based targeting of communicants to provide a personalized communication environment and an associated personalized visualization for each communicant. In some embodiments, the personalized visualization shows the presence states of the target set of other communicants who are present in one or more virtual areas in the network communications environment, where the presence states of the other communicants are contextualized by the particular areas/zones in which the communicants are present.

Figure 14:
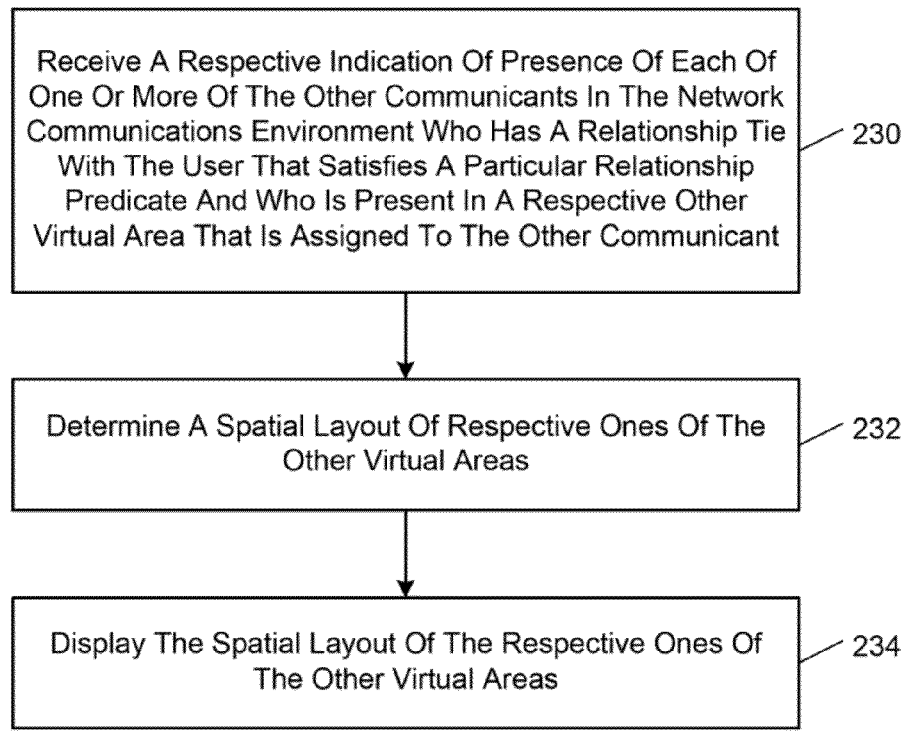
FIG. 14 is a flow diagram of an exemplary embodiment of a method of presenting a personalized visualization of contextualized presence states of a target set of communicants.

FIG. 14 shows an embodiment of a method that is implemented by a client network node in a process of presenting a personalized visualization of contextualized presence states of a target set of other communicants to the user. In this embodiment, the client network node receives a respective indication of presence of each of one or more of the other communicants in the network communications environment who has a relationship tie with the user that satisfies a particular relationship predicate and who is present in a respective other virtual area that is assigned to the other communicant (FIG. 14, block 230). The client network node determines a spatial layout of respective ones of the other virtual areas (FIG. 14, block 232). The client network node displays the spatial layout of the respective ones of the other virtual areas (FIG. 14, block 234).

Figure 15:
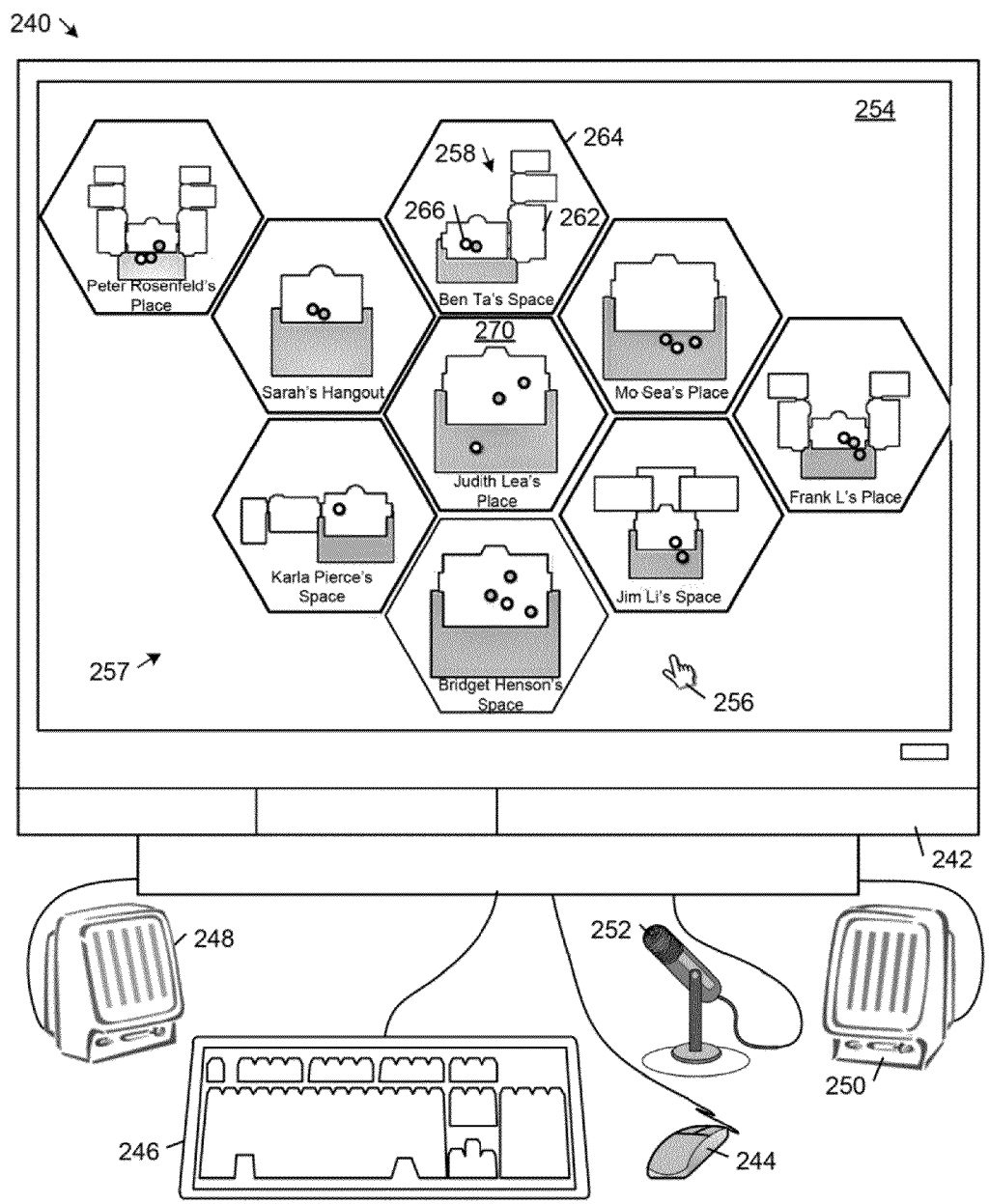
FIG. 15 is a block diagram of an exemplary embodiment of a client network node.

FIG. 15 shows an embodiment of an exemplary client network node that is implemented by a computer system 240, which is operated by a user "Judith Lea." The computer system 240 includes a display monitor 242, a computer mouse 244, a keyboard 246, speakers 248, 250, and a microphone 252. The display monitor 242 displays a graphical user interface 254. The graphical user interface 254 is a windows-based graphical user interface that can include multiple windows, icons, and a pointer 256. In the illustrated embodiment, the graphical user interface 254 presents a spatial layout 257 of virtual areas on the display monitor 242. Each of the virtual areas is assigned to a respective one of the other communicants who is present in the virtual area and who has a respective relationship tie with the user that satisfies a designated relationship predicate. Each of the virtual areas 258 is represented visually by a two-dimensional spatial layout of zones 262 that partition the virtual area and are contained within a respective hexagonal tile 264. As explained above, each of one or more of the zones 262 typically is associated with a respective governance rule that is configurable by the other communicant who is assigned the corresponding virtual area.

In some embodiments, the displayed set of virtual areas is filtered such that only those virtual areas in which at least one communicant is present are included in the spatial layout 257. In some embodiments, the user may configure the interface 240 so that the displayed set of virtual areas is filtered so that only those virtual areas having at least one zone in which at least two communicants are co-present are included in the spatial layout 257. In this way, the user can determine whether or not there are any ongoing conversations that she would like to join. In some of these embodiments, the presence states of the other communicants 84 also are filtered by virtual area type; in this way, only the presence states of communicants in one or more designated types of virtual areas (e.g., personal spaces, public spaces, work spaces, gaming spaces, and so on) are candidates for presentation in the spatial layout 257, providing additional context for inferring the current state of availability of the other communicants.

The received indications of the presences of the other communicants are visualized by respective sprites 266 that are positioned in the virtual area zones at the designated locations of the associated communicants' presences. Each of the zones typically is associated with a respective semantic signifier that contextualizes communicant presence in the zone. The respective indications of the associated other communicants' presences received by the computer system 240 typically include the semantic signifiers that are respectively associated with the particular zones. The semantic signifiers may include, for example, any of a respective textual signifier of an element of a physical environment and a respective graphical representation of an element of a physical environment. A zone may include a respective prop that is displayed graphically in the spatial layout 257. The prop may be associated with a network service (e.g., an online content providing service, an online gaming service, an online social networking service, and an online shopping service). A connection may be established with the network service by activation of the prop by a communicant who present in the zone. An indication of the activation of the prop may be shown in the spatial layout 257 conditioned on satisfaction of the governance rules respectively associated with the at least one zone.

In the illustrated embodiment, the user's virtual area 270 is positioned in the center of spatial layout 257 and the other virtual areas are positioned around the user's virtual area 270. The virtual areas in the spatial layout 257 may be arranged according to one or any combination of: strength of relationship tie between the associated other communicant and the user; frequency of interaction between the associated other communicant and the user; and recentness of interaction between the associated other communicant and the user. In these embodiments, the centroids of the other virtual areas are positioned at respective radial distances from the user's virtual area 270 that depend on one or any combination of these factors, where the virtual areas of the other communicants that have stronger relationship ties, higher frequencies of interaction, and/or more recent interactions with the user are positioned closer to the user's virtual area 270 whereas the virtual areas of other communicants are positioned farther away from the user's virtual area 270.

Figure 16:
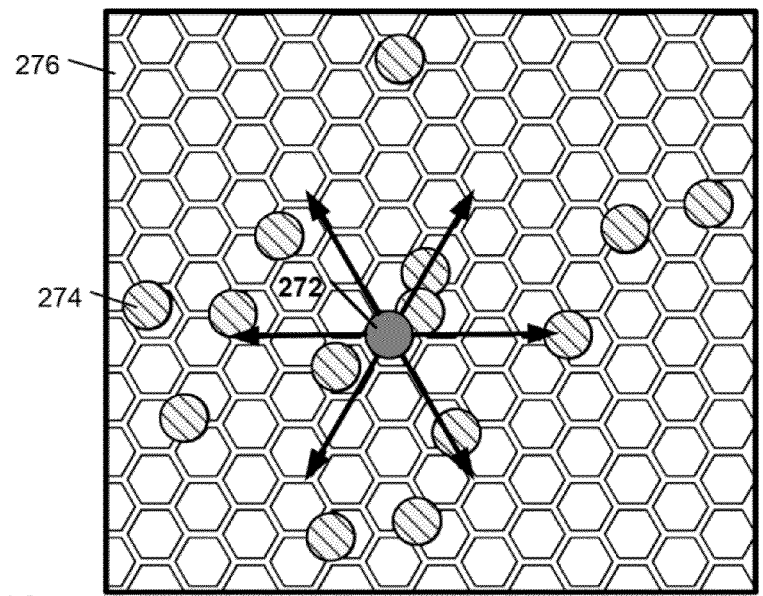
FIG. 16 is a diagrammatic view of elements of an exemplary process of determining a spatial layout of virtual areas.

Elements of an exemplary process of determining the spatial layout 257 of the hexagonal virtual area tiles 264 are shown diagrammatically in FIG. 16. In this example, the central node 272 corresponds to the centroid of the user's virtual area 270 and the other nodes 274 (shown by cross-hatched circles) correspond to the centroids of the other virtual areas 264. The rotational angles of the other nodes 274 about the central node 272 initially are set randomly. After the centroid locations of the other nodes 274 have been determined based on one or more of the factors discussed above, the centroid locations of the other nodes 274 are collapsed radially to form a close-packed arrangement of the nodes 274 about the central node 272, with each node 272, 274 centered in a respective hexagonal tile of an underlying hexagonal grid 276. The set of hexagonal tiles that are occupied by respective nodes 272, 274 correspond to the spatial layout 257 of the hexagonal tiles 264 shown in FIG. 15. In some embodiments, each time the spatial layout determining process is executed, the positions of the other communicants' virtual areas about the user's virtual area 270 are maintained at the same respective rotational angles that they originally were set to. In this way, even though the respective distances of the other communicants' virtual areas from the user's virtual area 270 will vary depending at least in part on who currently is present (or "online") in the virtual communicants environment and the current relationship levels between the user and the other communicants, the user will be able to more quickly determine the presence states of the communicants currently of interest by mentally associating particular regions of the spatial layout 257 with particular ones of the other communicants.

Figure 17:
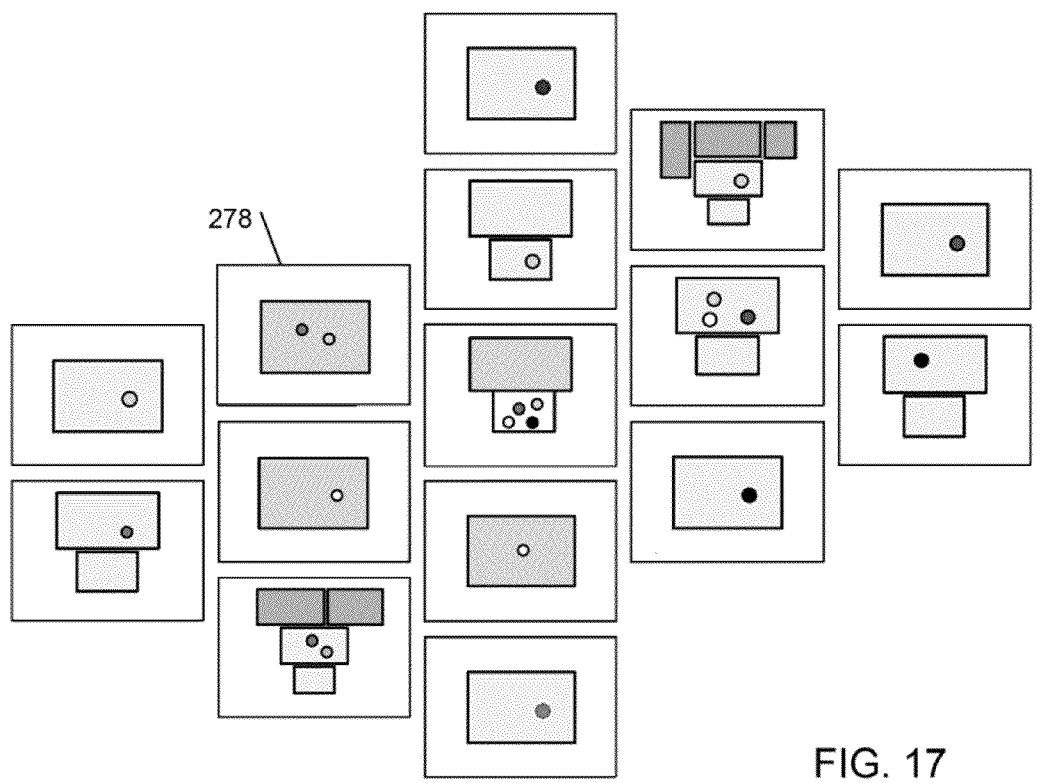
FIG. 17 is a diagrammatic view of an exemplary embodiment of a spatial layout of virtual areas.

In some other embodiments, the virtual areas of the target set of communicants are displayed in a close-packed spatial layout of tiles that have a shape other than hexagonal. For example, FIG. 17 shows an embodiment in which the virtual areas are displayed in rectangular tiles 278.

In some embodiments, the platform may modify the spatial layout 257 of the virtual areas in response to instruction from the user (e.g., dragging and dropping respective ones of the virtual area tiles 264 with a pointer 256 that is controlled by an input device, such as a computer mouse). The platform associates a definition of the modified spatial layout with the user (e.g., by storing the modified spatial layout definition in association with an identifier of the user).

The levels of visual detail and interactivity that are available to the user with respect to a particular zone of a particular virtual area typically depend on the user's relationship level (e.g., intimacy level or level of relationship strength) with the owner of the particular virtual area and one or more threshold relationship levels that are defined by one or more governance rules associated with the particular zone. In one exemplary embodiment, if the user is in a room, regardless of the user's relationship level with the zone owner, the user is provided with details of all the interactions occurring with the particular zone (e.g., the user can see a thumbnail of the file being shared on a view screen, hear and speak with other communicants in the zone, and see elements of a log of chat messages that were generated by communicants in the zone); if the user is outside the particular zone and the user's relationship with the zone owner satisfies a medium threshold relationship level (which typically is associated with a casual or semi-private zone), the user is provided with a high level of detail of the interactions occurring with the particular zone (e.g., the user can see where other communicants are present in the zone, see a visualization of their current states—talking, typing a chat message, whether or not their headphones and microphones are turned-on—and see whether any of the view screens are active, which may be indicated by a thumbnail image of the file being shared on a view screen); if user is outside the particular zone and the user's relationship with the owner does not satisfy the medium threshold relationship level, the user is provided with only a minimal level of detail of the interactions occurring within the zone (e.g., the user can see an outline of the floor plan, but the user cannot see where other communicants are present in the zone nor any other activity in the zone). In some embodiments, the switching and governance rules that are associated with the zones of the virtual area control how the network infrastructure services distinguish between those who satisfy the threshold relationship level for the particular zone from those who do not.

Referring back to FIG. 15, in addition to showing visualizations of the virtual areas and the presences of the target set of other communicants, the user interface 254 also typically incorporates navigation controls that enable the user to specify where to establish a presence in respective ones of the displayed virtual areas, and interaction controls that enable the user to manage interactions with one or more other communicants.

Figure 18:
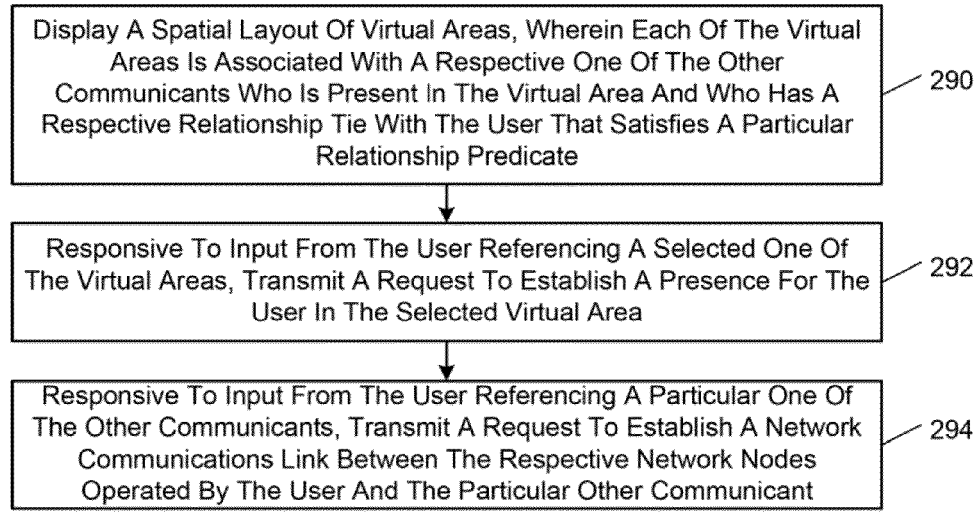
FIG. 18 is a flow diagram of an exemplary embodiment of a method executed by an embodiment of a client network node.

FIG. 18 shows an embodiment of a method by which the client network node 240 enables the user to establish a presence in one of more of the virtual areas in the spatial layout 257 and to manage interactions with one or more other communicants who are present in those virtual areas. In accordance with this method, the client network node 240 displays a spatial layout of virtual areas, wherein each of the virtual areas is associated with a respective one of the other communicants who is present in the virtual area and who has a respective relationship tie with the user that satisfies a particular relationship predicate (FIG. 18, block 290). Responsive to input from the user referencing a selected one of the virtual areas, the client network node 240 transmits a request to establish a presence for the user in the selected virtual area (FIG. 18, block 292). Responsive to input from the user referencing a particular one of the other communicants, the client network node 240 transmits a request to establish a network communications link between the respective network nodes operated by the user and the particular other communicant (FIG. 18, block 294).

Figure 19:
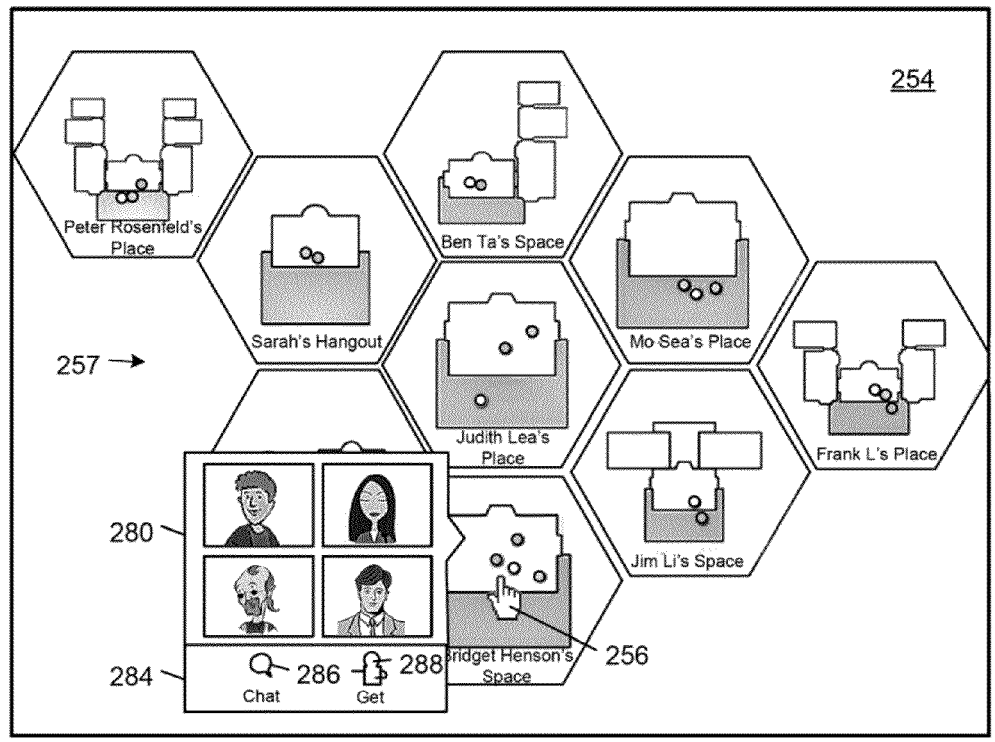
FIG. 19 is a diagrammatic view of an exemplary embodiment of a graphical user interface.

Referring to FIG. 19, in the illustrated embodiment, the user may mouse over any of the zones of the virtual areas displayed in the spatial layout 257 to reveal an interaction interface 280 that provides controls for interacting with the communicants who are present in the zone. In particular, the interaction interface 280 shows a graphical representation of each of the communicants in a display area 282 and a set of interaction controls in a toolbar area 284. The graphical representations of the communicants may be, for example, thumbnails of photos of the communicants or iconographic representations of the communicants. In response to the user's selection of a respective one of the graphical representations, an information window may be displayed that shows information about the selected communicant. The information window may show a message from selected communicant (i.e., "Out of the office next Wednesday"), a time stamp indicating when the message was posted, location information, and a hypertext link. The toolbar area 284 includes a Chat button 286 for initiating a chat with a selected one of the communicants and a Get button to invite the selected communicant to a selected location. Additional details regarding embodiments of the methods and functions invoked by the Chat button and the Get button are described respectively in §§ IV.B.2 and IV.B.4 of U.S. patent application Ser. No. 12/354,709, filed Jan. 15, 2009.

In addition, the user can attempt to establish a presence in a particular one of the zones of a particular virtual area displayed in the spatial layout 257 shown the graphical user interface 254 by selecting the particular zone and invoking a navigation control for establishing presence (e.g., by double-clicking on the zone with the pointer 256). As explained above, the particular zone typically is associated with an access control predicate that defines one or more conditions on one or more communicant attributes that control communicant access to the particular zone. In response to receipt of a request to enter the particular zone from the user, the platform establishes a presence for the particular communicant in the particular zone conditioned on one or more attributes of the particular communicant satisfying the access control predicate. In response to a determination that the one or more attributes of the user fail to satisfy the access control predicate associated with the particular zone, the platform may establish a presence for the particular communicant in another one of the zones of the particular virtual area (e.g., a public zone) that is associated with a respective access control predicate that is satisfied by one or more attributes of the user.

III. CONCLUSION

The embodiments that are described herein provide improved systems and methods for indicating presence in a network communications environment. In particular, these embodiments combine rich presence signaling through virtual area based contextualization with relationship based communicant targeting to provide a unique personalized communication environment for each user. Each virtual area typically includes multiple zones that provide different contexts for the presence states of the user and other communicants in those zones. Each zone may be associated with one or more semantic signifiers (e.g., a textual label, a visual design, a spatial layout, or other elements) that connote a particular context from which other communicants can infer a respective multi-faceted presence state for each of the communicants who is present in the zone. In some embodiments, a spatial metaphor enriches the presence states within a zone with location-based cues, such as proximity of communicants to elements of the zone or proximity of communicants to each other. In some embodiments, a user is able to personalize a virtual area (or "personal space") with zones that provide different respective contexts for the presence states of the user and other communicants in those zones. In these embodiments, the user typically is able to associate each zone with a respective governance rule that defines predicates for controlling who receives indications of presence in the zone, who can establish a presence in the zone, and who can access resources associated with the zone.

Other embodiments are within the scope of the claims.

The invention claimed is:

1. A method, comprising:
in a network communications environment supporting realtime communications between a user and other communants operating respective network nodes,
determining each of one or more of the other communicants in the network communications environment who has a social network tie with the user that satisfies a particular relationship predicate and who is present in a zone of a respective other virtual area that is assigned to the other communicant; and
transmitting to the network node operated by the user a respective indication of presence of each of the determined other communicants in each of the one or more zones of the respective other virtual areas.

2. The method of claim 1, wherein satisfaction of the particular relationship predicate is conditioned on a communicant having social network tie with the user that meets a threshold relationship type level in a hierarchical arrangement of relationship types ordered by strength of relationship.

3. The method of claim 1, further comprising filtering the virtual areas in which the determined communicants are present such that only those virtual areas in which at least two communicants are present are transmitted to the network node operated by the user.

4. A method, comprising:
in a network communications environment supporting realtime communications between a user and other communicants operating respective network nodes,
receiving a respective indication of presence of each of one or more of the other communicants in the network communications environment who has a social network tie with the user that satisfies a particular relationship predicate and who is present in a zone of a respective other virtual area that is assigned to the other communicant;
determining a spatial layout of respective ones of the zones of the other virtual areas; and
on a display, displaying the spatial layout of the zones of the respective ones of the other virtual areas.

5. The method of claim 4, wherein the determined spatial layout comprises a two-dimensional spatial layout of zones of the respective ones of the other virtual areas.

6. The method of claim 5, wherein the zones of each of the respective other virtual areas in the spatial layout are contained within a respective hexagonal tile.

7. The method of claim 4, wherein the determining comprises filtering the other ones of the virtual areas so that each of the respective other virtual areas in the spatial layout has at least one zone in which at least two communicants are co-present.

8. The method of claim 4, wherein the determining comprises filtering the other ones of the virtual areas so that the respective zones of the other virtual areas are associated with one or more target virtual area types.

9. A method, comprising:
in a network communications environment supporting realtime communications between a user and other communicants operating respective network nodes,
on a display, displaying a spatial layout of virtual areas, wherein each of the virtual areas is associated with a respective one of the other communicants who is present in the virtual area and who has a respective social network tie with the user that satisfies a particular relationship predicate;
responsive to input from the user referencing a selected one of the virtual areas, transmitting a request to establish a presence for the user in the selected virtual area; and
responsive to input from the user referencing a particular one of the other communicants, transmitting a request to establish a network communications link between the respective network nodes operated by the user and the particular other communicant.

10. The method of claim 9, wherein each of the virtual areas is partitioned into multiple respective zones each of which is associated with a respective governance rule that is configurable by the associated other communicant and with respect to which the associated other communicant is permitted to have a presence.

11. The method of claim 10, wherein the displaying comprises, for each of the virtual areas:
on the display, displaying graphic representations of the respective zones of the virtual area; and
on the display, showing a respective indication of the presence of the associated other communicant in a particular one of the zones of the virtual area in which the associated other communicant is present, conditioned on the user having a respective social network tie with the associated other communicant that satisfies the respective governance rule that is associated with the particular zone.

12. The method of claim 11, wherein each of the zones is associated with a respective semantic signifier that contextualizes communicant presence in the zone, and the respective indications of the associated other communicants' presences in the particular zones comprises the semantic signifiers that are respectively associated with the particular zones.

13. The method of claim 12, wherein at least one of the semantic signifiers comprises at least one of: a respective textual signifier of an element of a physical environment; and a respective graphical representation of an element of a physical environment.

14. The method of claim 11, wherein at least one of the zones of at least one of the virtual areas comprises a respective prop that is associated with a network service and is activatable by a communicant present in the at least one zone to establish a connection with the network service, and the displaying comprises displaying a graphic representation of the respective prop in the spatial layout.

15. The method of claim 14, wherein the network service is one of: an online content providing service; an online gaming service; an online social networking service; and an online shopping service.

16. The method of claim 14, wherein the displaying comprises, on the display, displaying an indication of activation of the prop in the spatial layout conditioned on satisfaction of the relationship predicate respectively associated with the at least one zone.

17. The method of claim 9, wherein the spatial layout of virtual areas comprises a respective graphic representation of each of the virtual areas arranged according to one or any combination of: strength of social network tie; frequency of interaction between the associated other communicant and the user; and recentness of interaction between the associated other communicant and the user.

18. The method of claim 9, further comprising displaying a virtual area associated with the user in the spatial layout of virtual areas.

19. The method of claim 18, wherein the virtual area associated with the user is shown in a central location in the spatial layout and the virtual areas associated with the other communicants are shown in respective locations around the central location in the spatial layout.

20. At least one non-transitory computer-readable medium having computer-readable program code embodied therein, the computer-readable program code adapted to be executed by a computer in a network communications environment supporting realtime communications between a user and other communicants operating respective network nodes to implement a method comprising:
  on a display, displaying a spatial layout of virtual areas, wherein each of the virtual areas is associated with a respective one of the other communicants who is present in the virtual area and who has a respective social network tie with the user that satisfies a particular relationship predicate;
  responsive to input from the user referencing a selected one of the virtual areas, transmitting a request to establish a presence for the user in the selected virtual area; and
  responsive to input from the user referencing a particular one of the other communicants, transmitting a request to establish a network communications link between the respective network nodes operated by the user and the particular other communicant.

21. The method of claim 1, wherein each social network tie represents a respective social relationship between the user and a respective one of the other communicants.

22. The method of claim 4, wherein each social network tie represents a respective social relationship between the user and a respective one of the other communicants.

23. The method of claim 9, wherein each social network tie represents a respective social relationship between the user and a respective one of the other communicants.

* * * * *